United States Patent
Herrmann et al.

(10) Patent No.: US 11,867,942 B1
(45) Date of Patent: Jan. 9, 2024

(54) ENCAPSULATED ILLUMINATED AUTOMOTIVE GLAZING AND METHOD OF PRODUCING THEREOF

(71) Applicant: AGP WORLDWIDE OPERATIONS GMBH, Zug (CH)

(72) Inventors: Nils Herrmann, Aachen (DE); Henry Mariano, Lima (PE); Andres Fernando Sarmiento Santos, Canton, MI (US); Roshan Jha, Stockstadt am Main (DE); Fernando Garcia Chavez, Puebla (MX); Gonzalo Rafael Vizcarra Mendoza, Lima (PE); Ian Jam Riofrio Véliz, Lima (PE); Charles Stephen Voeltzel, Shelby Township, MI (US); Gino Lozada, Lima (PE)

(73) Assignee: AGP Worldwide Operations GMBH, Zug (CH)

( * ) Notice: Subject to any disclaimer, the term of this patent is extended or adjusted under 35 U.S.C. 154(b) by 0 days.

(21) Appl. No.: 18/178,415

(22) Filed: Mar. 3, 2023

Related U.S. Application Data

(60) Provisional application No. 63/316,405, filed on Mar. 3, 2022.

(51) Int. Cl.
*F21V 8/00* (2006.01)
*B29D 7/00* (2006.01)
*B60J 1/00* (2006.01)

(52) U.S. Cl.
CPC ............... *G02B 6/009* (2013.01); *B29D 7/00* (2013.01); *B60J 1/001* (2013.01); *G02B 6/0073* (2013.01); *G02B 6/0095* (2013.01)

(58) Field of Classification Search
CPC .... G02B 6/009; G02B 6/0073; G02B 6/0095; B29D 7/00; B60J 1/001
See application file for complete search history.

(56) References Cited

FOREIGN PATENT DOCUMENTS

| WO | WO-2008058855 A1 | * | 5/2008 | ....... B32B 17/10018 |
| WO | WO-2019094285 A1 | * | 5/2019 | ....... B32B 17/10036 |
| WO | WO-2021116984 A1 | * | 6/2021 | ........... B32B 17/061 |

* cited by examiner

*Primary Examiner* — Mary Ellen Bowman
(74) *Attorney, Agent, or Firm* — The Morales Law Firm; Joseph L. Morales

(57) ABSTRACT

The disclosure refers to an encapsulated illuminated glazing in which a cavity is first formed in the encapsulation and then, after completion of the encapsulation, the light strip is slid into and installed in the cavity.

27 Claims, 22 Drawing Sheets

ENCAPSULATED ILLUMINATED AUTOMOTIVE GLAZING AND METHOD OF PRODUCING THEREOF

FIELD OF THE DISCLOSURE

The disclosure relates to the fields of laminated automotive glazing and automotive lighting.

BACKGROUND OF THE DISCLOSURE

Designing vehicles with large glass roofs poses a challenge for cabin lighting. Mounting a light on the glass roof is often not practical, possible, or desirable due to the need to route the wiring harness supplying power to the light across the glazing, add a cover to conceal the harness from the interior, and include a black print to hide the harness from the exterior.

In the automotive industry, LED lighting has gained popularity for signaling and lighting purposes. Initially available as aftermarket products, LED signaling bulbs were a direct replacement for standard OEM incandescent bulbs. However, the early versions were costly and produced lower light emissions than their incandescent counterparts.

With the global move towards the elimination of incandescent lighting, the LED industry has grown exponentially, resulting in economies of scale that have substantially reduced technology cost. Simultaneously, research and development investments have led to improved durability, efficiency, reduced size and much higher light intensity. Many light fixtures now have the LEDs permanently attached to the circuit board that handles the LED drivers, controls, and other functions.

From ambient cabin lighting to headlamps, LEDs have become a cost-effective replacement for incandescent bulbs and other conventional lighting technologies. With a lifespan of up to 50,000 hours. In fact, they may outlast the vehicle itself.

Due to their low cost, small size, and reliability, LEDs have expanded beyond instrument panels and controls. Automakers now place them above doors, in door panels, under seats, in footwells, cup holders, and other areas previously left unilluminated.

New vehicle interiors are now commonly illuminated by multiple low-intensity light sources, creating a desired and modern aesthetic. This ambient lighting, noticeable only in low light conditions, provides OEMs with a low-cost differentiator, and the large percentage of interior surface area comprised by glazing makes it a natural location for lighting.

However, embedding LEDs in laminated glass has been challenging, particularly due to the high intensity of LEDs intended for general illumination. Connecting the LEDs in a way that hides wires is difficult, and solutions include embedding very thin wires in the interlayer, using a transparent conductive coating on the glass, or a transparent plastic substrate with a transparent conductive coating. However, these approaches add complexity and cost. Additionally, the small size of the LED die and the lack of a lens or diffuser in a laminate results in high light intensity, which can cause night driving difficulties and create heat issues. While LEDs are more energy efficient than incandescent lamps, they still generate heat that must be managed. Overheating can occur if the LEDs are too close together, and a temperature gradient arising from the LEDs can result in undesirable optical distortion due to the temperature-dependent index of refraction of PVB.

An alternative method of illumination uses the glass layers of the laminate to direct light to the cabin interior, functioning as a light guide.

A light guide is a device, usually constructed from transparent glass or plastic that conducts and direct light from a light source, commonly known as lighting means, to where it is needed, while also shaping and collimating the beam. Light guides can utilize Total Internal Reflection, reflective coating or a combination of both. Total Internal Reflection (TIR) occurs when there is a mismatch between the Index Of Refraction (IOR) at the interface between two materials.

The index of refraction (IOR) of a material is defined as the ratio of the velocity of light (c) in a vacuum to the velocity (v) in the material.

$$IOR = c/v$$

The refractive index of a material is always equal to or greater than one, and the denser the material, the slower light travels through it. Refraction occurs when a beam of light changes direction as it travels from one medium to another media with a different refractive index, causing it to bend at the interface. The angle of refraction is determined by the ratio of the refractive index of the two media. When light passes from a medium with a higher refractive index to one with a lower refractive index, it will refract and exit the denser medium if the angle of incidence is less than the critical angle. Total Internal Reflection (TIR) occurs if the angle of incidence is equal to or greater than the critical angle, which is the smallest angle of incidence where TIR occurs. Any light incident to the interface at an angle smaller than the critical angle will refract into the adjacent medium. If n1 is the refractive index of the glazing and n2 is the refractive index of the adjacent medium in direct contact with it such as in surface one 101 or surface four 104, then the critical angle θc is calculated by:

$$\theta\_c = \arcsin[n\_2/n\_1]$$

Using refractive index values of 1 for air, 1.53 for glass, we get a critical angle of:

$$\theta\_(glass/air) = 40.81°$$

Total internal reflection (TIR) occurs when the critical angle of a substance present on the surface is greater than the angle of incidence of the internal light. This principle is the basis of fiber optic cables, in which a glass fiber is clad in a transparent material with a lower refractive index than the fiber core, allowing total internal reflection at large angles of incidence. By varying the angle of incidence, up to 3,000 separate beams can be carried over the same multimode fiber.

Similarly, a sheet of glass can also be used as a light guide, is known as light conductive layer. The index of refraction of air is 1 while the index of refraction of soda-lime glass is 1.52. As a result of this large mismatch between the index of refraction of the glass and air, most of the light traveling parallel to the major glass surfaces, as is the case when light is injected from the edge where the angle of incidence is near zero, is reflected internally. Very little of the light is emitted from the major surfaces.

Signs printed on a transparent substrate and illuminated by a light source injecting light into one of the edges have been known for decades. The translucent printed graphic on the transparent substrate disperses the light trapped inside of the glass, illuminating the graphic, while the background remains dark. The information on an EXIT sign, as an example, must be viewable under all lighting conditions. The edge injection illumination allows the sign to be seen and highly visible under low lighting conditions without becoming distracting and without the glare or shadows that might occur if conventional lighting were to be used.

In the same manner, light injected into the vehicle glazing from a lighting means can be used to provide ambient cabin illumination. The glass functions as a wave guide for the light. The light is decoupled and refracted by a light dispersing means on the glass surface. Light dispersing surface treatments and materials are known that when applied to glass are substantially invisible when the lighting means is in the off state while providing illumination in the on state. The light dispersing may be patterned to form a graphic.

In the most commonly implemented illuminated laminated glazing, the inner glass layer is illuminated by a lighting means along at least a portion of the periphery of the glazing and with the light dispersing means deposited on a glass layer major surface interior to the laminate, thereby protecting the dispersing means from wear and damage. Coatings can be applied to the glass layers to further improve performance by reflecting incidental light from the dispersing means inboard. An opaque layer, such as a black frit, may also be used to block light from exiting to the exterior of the vehicle. In the same manner, a dark composition of outer glass layer and/or a dark tint plastic interlayer may be used to minimize the amount of light visible from outside of the vehicle. Conversely, the light dispersing means, plastic interlayer and outer glass layer can be designed to maximize visibility from the exterior in order to use the light for signaling.

This type of edge injected illuminated glazing is offered as an option on a number of high-end vehicles where it serves more of a differentiator for better aesthetics rather than for any functionality. The low level of illumination is only sufficient for ambient lighting. Multicolor LEDs can be used, and the LEDs can be sequenced so as to produce an impressive, high-tech aesthetic along with a very unique look and feel.

Several examples of illuminated automotive laminates can be found in the prior art. They typically include: a light guide layer, a lighting means directing light into the light guide layer at an edge of the light guide layer, and a light diffusing means.

The lighting means comprise a light source and other associated components needed to inject the light into the edge of the glass. The lighting means are also known as a light bar or light strip. The light source mostly used is the light-emitting diodes (LED).

A typical embodiment comprises a laminated glazing with two glass layers wherein at least a portion of the periphery of a first glass layers is offset inboard from the second glass layer. In the area of the first glass layer that does not overlap the offset second glass layer, the light strip is positioned. The light strip directs light into the edge of the smaller second glass layer which serves as a light conductive layer.

Due to the offset of the inner glass layer, the resulting single glass layer in the area where the lighting means is mounted is weaker than where there are two full glass layers. As a result, it may be necessary to: increase the thickness of the first glass layer, strengthened the glass layer by chemical or thermal tempering, reinforce the glass layer, or use some combination of the previous methods.

The reinforcement may be accomplished by means of extending the body opening sheet metal flange inboard, bonding a metal frame to the glazing, encapsulating the edge in at least the offset portion, or some combination of these methods.

Encapsulation performed by injection molding is the preferred method of protecting the offset single glass layer.

Injection molding is commonly used to economically form complex plastic shapes. Injection molds can incorporate a wide array of features including holes, ribs, inserts, cores, and bosses. It is possible to produce parts having a very smooth surface. Parts made by this process can hold very tight tolerance, similar to those of machined metal parts.

A large number of thermoplastics and elastomers, with a wide range of properties, are available that can be used in the injection molding process.

Polyurethane includes a broad range of plastics with very different properties. A moisture cure polyurethane is used to bond glazing to the vehicle window opening flange. A type of polyurethane is commonly used for automotive glazing encapsulation, high density polyurethane (PUR RIM). This type is a thermoplastic highly durable and has an even stronger bond to the glass than the version used to mount the glazing to the vehicle providing for an exceptional watertight seal.

Polyvinyl chloride (PVC) is another popular plastic used for automotive glazing encapsulation. While PVC is inexpensive and forms a strong bond to glass processing has some drawbacks. It outgasses noxious fumes during forming and is susceptible to overheating during forming. PVC is typically use to encapsulated small parts like quarter windows.

Thermoplastic elastomers, (TPE) have rubber like properties. They are used when the encapsulation must flex and/or a softer more flexible part is needed.

Polyethylene Propylene Diene Monomer Rubber (EPDM) has very good sealing properties forming a strong bond to the glass while remaining very flexible and durable.

All of these materials have excellent adhesion to the glazing as well as to the black frit and the metal and plastic components that may be added as inserts. They also have very good adhesion to the mold. After each cycle, the mold needs to be cleared of any debris and coated with a release agent prior to the next cycle.

While the initial investment in injection molding tooling can be relatively high, a tool with a mold made of H13 steel, can last in excess of 500,000 parts. The cycle time is low, and the process can be completely automated making it ideal for high quantity series production. There is very little waste, and the leftover plastic can be reused.

Encapsulation has a number of advantages when applied to automotive glazing. An encapsulated glazing can hold tolerances that are much tighter than that of the glazing due to the machining process used to make the mold having tolerances for size and shape that are far better than that of the glass forming process. The encapsulation gives the designer more freedom as the molding can take on shapes that are not possible to form in glass, the encapsulated glazing provides a better water and wind seal, and improved aesthetics. The encapsulated glazing is far stronger and stiffer than that original glazing allowing for the use of thinner and lighter glass layers.

Another advantage is the that injected plastic will form a strong permanent watertight bond to the glazing with no secondary adhesives needed. The precise shape and strong bond results in superior air flow, water management, resistance to water and dirt as well as lower noise levels in the cabin from reduced wind noise as compared to other methods used to mount and protect the edge of the glazing such as bonded on extrusions and other trim.

The raw plastic, usually in the form of pellets, it feed from a hopper into a heated cylinder with an auger. The plastic is heated to above its melting point. As the auger rotates, the plastic is moved forward. Using hydraulic pressure, the hot liquid plastic is injected at high pressure through a check valve into the mold and allowed to cool. The volume of the shot is precisely controlled so as to not overfill or underfill the mold.

The temperature and pressure required will depend upon the encapsulation material as well as the volume, shape, and complexity of the mold. Plastic may be injected from more than one opening which also will change the optimum temperature and pressure. Likewise, the time required for the plastic to solidify sufficient for the part to be removed from the mold will depend upon many parameters.

For the typical automotive part over the range of plastics discussed, a minimum temperature in the range of 80° C. to 100° C. is needed. Some materials will undergo an exothermic reaction raising the temperature even higher.

The encapsulation process used to make automotive encapsulated parts is a type of injection molding known as insert molding. An example of insert molding would be the process used to manufacture handles on hand tools like screwdrivers. The shank portion of the tool is inserted into the mold. The plastic is injected encapsulating and permanently bonding to the shank and forming the handle.

In the case of an automotive encapsulation, the glazing is the insert. The glazing is inserted into the mold and clamped in place. The hot liquid plastic is injected filling the mold. The plastic is allowed to cool and then the encapsulated glazing is removed. Components in addition to the glazing such as fasteners, reinforcements, mounting pins, clips, studs, hinges, and other hardware can also be inserted into the mold becoming a permanent part of the glazing. The process can also be used to form other components that would otherwise need to be attached to the glazing such as dividers, water damns, etc. The encapsulation often replaces the bonded or otherwise attached trim and seals commonly applied to hide and/or decorate the edge of glass.

FIGS. 9A and 9B show typical encapsulation 36 cross-sections. In both, a black enamel frit 6 has been applied to surfaces two 102 and four 104. This is typically done to enhance adhesion to the plastic as well as to hide the encapsulation from the interior and exterior of the vehicle. In FIG. 9A, the laminate is encapsulated on three sides. The encapsulation on the outside surface one 101 is twice as thick as the glass. This type of encapsulation emulates the removable trim that was often used on windshield and rear windows. In 9B a flush encapsulation is shown. The glass is encapsulated on two side with the plastic flush with surface one 101 of the laminate.

Another advantage of encapsulations with electronic components is that the encapsulation serves to protect the components from exposure to the elements. Most encapsulations can provide up to IP67 level protection.

The designation for the level of environmental protection provided by an enclosure, coating or other protection means has been standardized as Ingress Protection numbers, IP. For automotive electrical applications, where the device is exposed to the elements, such as those under the hood or located on the underside or exterior of the vehicle, a rating of IP67 is required. These are known as "wet" locations or the "wet" side of the glazing. This level provides protection from the ingress of any solid material and ingress of water while submerged for thirty minutes in 15 cm to 1 meter of water.

Typically, there are two light strips positioned upon opposite side of the glazing. Each is relatively expensive having multiple LED die and other electronic and optical components affixed to a flexible printed circuit.

There are a number of disadvantages to overmolding the light strips.

The electronics of the light strip are sensitive to heat and pressure. Also, the light strip needs to inject the light into the encapsulated edge of the light conducting glass layer. If the injected plastic covers the edge of the light conducting layer the light will not be injected. Therefore, the light strip needs to be covered and sealed prior to encapsulation. Covering the light strip can prevent plastic from getting between the injection glass surface but does not protect the electronics from the heat and pressure of the process.

As the light strip requires an electrical connection any wires must be routed through the encapsulation. This increases the complexity and cost of the mold and adds and additional source of rejects. The wires need a portion of the length of the cable overmolded or fitted with a grommet to prevent leakage of the hot plastic from the mold. This grommet or oversold is then fitted into a feature cut into the mold that seals around the wires. The cavity in the mold must also accommodate the full length of the cable. Including the portion that is outside of the encapsulation. Forming this feature in the mold is an added step and expense. Due to the tolerances and fit of the grommet/overmold there is usually some injected plastic that finds its way around resulting in flash that must be trimmed.

To minimize waste, the glazing is inspected for any type of defect prior to the encapsulation process. If the encapsulation process results in a defective encapsulation, the entire encapsulated part must often be discarded as it can be difficult to repair the types of defects that can occur in an encapsulation. When this happens, the light strips are also scrapped as they cannot be removed and reused.

In the same manner, even if the light strips are tested prior to encapsulation, it is possible that the sensitive electronics of the light strip can be damaged by the heat and pressure of the encapsulation process. In this case, we also must scrap the entire encapsulated glazing. To prevent this type of failure, additional sealing and reinforcement is often needed to protect the light strip from damage during encapsulation. It is typical to wrap the light bar in a protective cover. The gap between the light strip and the glass surface must be sealed to prevent the ingress of plastic. More expensive components, which are not as sensitive to heat and pressure, also must be used.

Even when the encapsulation is successful and a good part is produced, the light strip may fail in the field after installation in the vehicle. When this happens, with no way to service the light strip the entire glazing must be replaced.

One method that has been used to solve these problems forms the encapsulation with an open recess in it. The light strip is then installed in the recessed area. To protect the light strip from the environment a cap must installed over the recess. As the cap runs the length of the light strip and must be installed on a complex curved surface, this method suffers from problems in maintaining a watertight seal, has an elevated level of complexity and required an excessive amount of labor to manufacture.

Another issue is thermal management during operation. The LEDs can generate a substantial quantity of heat. When the light strip is encapsulated, it becomes encased in the plastic of the encapsulation. The plastics typically used are not good thermal conductors. In fact, they are excellent thermal insulators. With the light strip in direct contact with and surrounded by this plastic, heat tends to build up. As a result, it may be necessary to reduce performance and/or derate the components to keep the temperature at an acceptable level and maintain durability.

It would be desirable to have an illuminated laminate without the drawbacks of the prior art.

BRIEF SUMMARY OF THE DISCLOSURE

The invention is an illuminated laminate automotive glazing comprising: at least two glass layers, wherein at least one of the glass layers functions as a light-conducting layer, at least one standard automotive plastic interlayer wherein the plastic interlayer is positioned between the two glass layers and serves to permanently bond the two glass layers together, an encapsulation comprising at least one cavity, a sliding means, and a light strip utilizing the sliding means and inserted by sliding into the cavity with the light-strip comprising at least one circuit board to which components are electrically connected, at least one light source and advantageously in some embodiments, at least one light guide directing light from the light source and injecting light into the light-conducting layer.

The encapsulated illuminated glazing of the invention has at least one light strip that is installed after the glazing has been encapsulated. The encapsulation comprises a cavity that will fit the light strip accounting for process tolerances, any clearance needed, any inserts, and any other features needed. A sliding means is provided to facilitate easy installation of the light strip in the cavity. The light strip comprises an electrical circuit board, at least one light source. Advantageously in some embodiments, the invention comprises as well at least one light guide serving to shape the beam and guide the light from the at least one light source to where the light is injected into the glazing light conductive layer. By having the light strip and components inserted after encapsulation, the light strip is not exposed to the excessive temperature and pressure of the encapsulation process and less expensive components can be used. This also eliminates the additional sealing and protection needed to protect the light strip from being covered by the hot plastic during encapsulation and facilitates routing of the electrical connection wires through encapsulation.

With the surface area of the light strip in contact the insulating plastic minimized across most of the surface area, thermal management during operation is improved. Even where the light strip is in direct contact with the walls of the cavity, there is still a thin film of air between the cavity wall and components.

The present disclosure also discloses a method to manufacture an encapsulated illuminated glazing. The method comprises the steps of: providing an injection molding machine, a mold, a glazing, at least one light strip, at least one core and optionally one sliding means insert. Attaching said core or sliding means to said glazing. Placing glazing and optionally the sliding means into said mold. Using the injection molding machine to inject plastic into and filling said mold. Allowing the plastic to cool. Removing the glazing from said mold. Removing said core from encapsulation. Providing sliding means. Sliding light strip into sliding means and inserting plug in each cavity opening.

The present disclosure further comprises an additional method to manufacture an encapsulated illuminated glazing. The method comprises the steps of: providing an injection molding machine, a mold, a glazing, at least one light strip, the mold being designed to generate a cavity in the encapsulation, and optionally one sliding means insert. Placing the glazing and optionally the sliding means into said mold. Using said injection molding machine to inject plastic into and filling said mold. Allowing plastic to cool. Removing the glazing from said mold. Sealing the cavity generated by the first encapsulation. Providing a second injection molding machine and a second mold. Placing the glazing with the first encapsulation into the second mold. Removing the glazing from said mold. Providing sliding means. Sliding light strip into sliding means and inserting plug in each cavity opening.

Advantages

High level of environmental protection for the light strip.
The light strip can be replaced if defective.
Field replacement is enabled.
If the encapsulation is defective and the glazing is rejected, the light strip is not wasted.
The light strip can be cooled by convective or forced circulation of ambient air or a coolant inside of the cavity.
The thermally insulation of the light strip reduced.
Convective/forced cooling is possible due to the void resulting from the light strip having a smaller cross-sectional area than the cavity.
Improved thermal management.
Reduced need to derate the light strip components for heat management.
No need of additional sealing components to protect the light strip during the high pressure and temperature process of the encapsulation and the encroachment of the hot plastic between the glass surface and the light injection surface of the light strip.
No risk to damage the light strip during the encapsulation process
Less expensive components can be used in the light-strip as they do not need to withstand the heat and pressure of encapsulation.
Facilitate routing of the electrical connection wire through encapsulation

Reference Numerals of Drawings

2 Glass.
4 Bonding/Adhesive layer (plastic Interlayer).
6 Obscuration/Black Paint/Black enamel frit.
12 Infrared reflecting film.
18 Cavity.
20 Infrared reflecting coating.
22 Light source.
24 Light guide.
26 Circuit board.
28 Light strip.
30 Heat dissipation material.
32 Sliding means.
34 Spring.
36 Encapsulation.
38 Aperture.
39 Centerline.
40 Plug.
52 Adhesive.
54 Core.
56 Insert.
58 Release coating.
101 Exterior side of glass layer 1 (201), number one surface.
102 Interior side of glass layer 1 (201), number two surface.
103 Exterior side of glass layer 2 (202), number three surface.
104 Interior side of glass layer 2 (202), number four surface.
201 Outer glass layer.
202 Inner glass layer.

DETAILED DESCRIPTION OF THE DISCLOSURE

The present disclosure can be understood by reference to the detailed descriptions, drawings, examples, and claims, of this disclosure. However, it is to be understood that this disclosure is not limited to the specific compositions, articles, devices, and methods disclosed unless otherwise specified, as such can, of course, vary. It is also to be understood that the terminology used herein is for the purpose of describing aspects only and is not intended to be limiting.

The following terminology is used to describe the laminated glazing of the disclosure.

A glazing is an article comprised of at least one layer of a transparent material which serves to provide for the transmission of light and/or to provide for viewing of the side opposite the viewer and which is mounted in an opening in a building, vehicle, wall or roof or other framing member or enclosure.

Left, right, front, and rear shall be defined relative to an occupant of the vehicle seated and facing in the normal forward direction of the vehicle. Inboard and outboard are relative to the center of the glazing with inboard being the direction from the edge of the glazing towards the center and outboard from the edge of glass in the direction away from the center of the glazing.

The structure of the disclosure is described in terms of the layers comprising the glazing. The meaning of "layer," as used in this context, shall include the common definition of the word: a sheet, quantity, or thickness, of material, typically of some homogeneous substance and one of several.

A glazing for a typical laminated windshield comprises two glass layers and a plastic interlayer. An interlayer layer is of the same area as the glass layers.

When multiple layers that vary widely in thickness are illustrated, it is not always possible to show the layer thicknesses to scale without losing clarity. Unless otherwise stated in the description, all figures are to be considered as for illustrative purposes and are not drawn to scale and thus shall not be construed as a limitation.

Figure 1A:
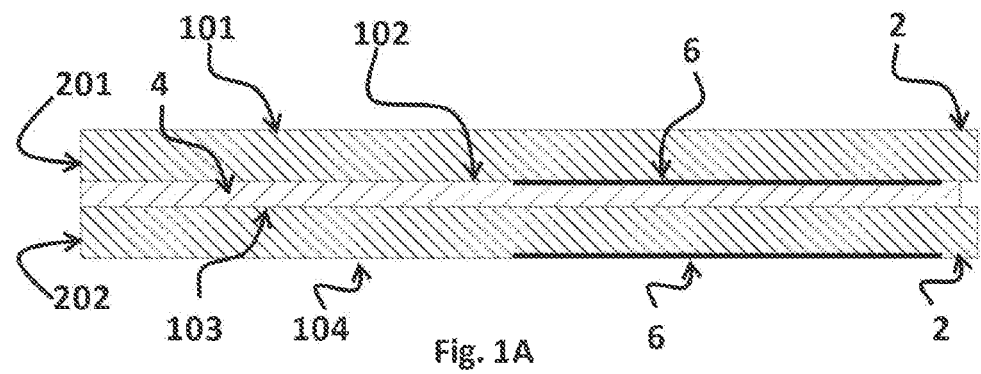
FIG. 1A Cross section of a typical laminated automotive glazing.
Figure 1B:
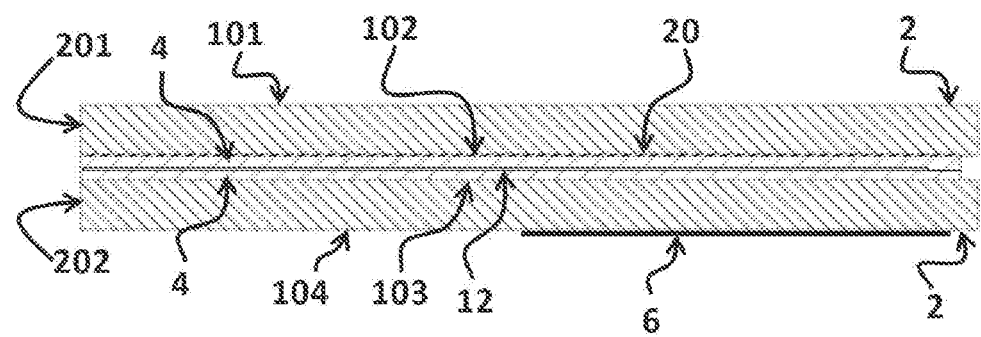
FIG. 1B Cross section of a typical laminated automotive glazing with performance film and coating.

Typical automotive laminated glazing cross sections are illustrated in FIGS. 1A and 1B. A laminate is comprised of two layers of glass, the exterior or outer 201 and interior or inner 202 that are permanently bonded together by a plastic layer 4 (interlayer or also known as adhesive layer or plastic interlayer). In a laminate, the glass surface that is on the exterior of the vehicle is referred to as surface one 101 or the number one surface. The opposite face of the exterior glass layer 201 is surface two 102 or the number two surface. The glass 2 surface that is on the interior of the vehicle is referred to as surface four 104 or the number four surface. The opposite face of the interior layer of glass 202 is surface three 103 or the number three surface. Surfaces two 102 and three 103 are bonded together by the plastic layer 4. An obscuration 6 may be also applied to the glass. Obscurations are commonly comprised of black enamel frit printed on either the number two surface 102 or number four surface 104 or on both. The laminate may have a coating 20 on one or more of the surfaces. In an exemplary embodiment, the coating 20 can be an infrared reflecting coating 20. The laminate may also comprise a film 12 which in an exemplary embodiment can be an infrared reflecting film 12 laminated between at least two plastic layers 4.

Figure 1C:
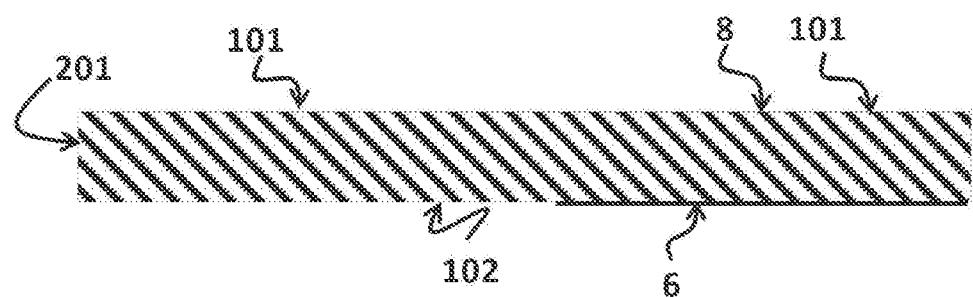
FIG. 1C Cross section of a typical tempered monolithic automotive glazing.

FIG. 1C shows a typical tempered automotive glazing cross section. Tempered glazing is typically comprised of a single layer of glass 201 which has been heat strengthened.

The term "glass" can be applied to many inorganic materials, including many that are not transparent. For this document we will only be referring to transparent glass.

The types of glass that may be used include but are not limited to the common soda-lime variety typical of automotive glazing as well as aluminosilicate, lithium aluminosilicate, borosilicate, glass ceramics, and the various other inorganic solid amorphous compositions which undergo a glass transition and are classified as glass including those that are not transparent. Laminates, in general, are articles comprised of multiple sheets of thin, relative to their length and width, material, with each thin sheet having two oppositely disposed major faces and typically of uniform thickness, which are permanently bonded to one and other across at least one major face of each sheet. Safety glass is glass that conforms to all applicable industry and government regulatory safety requirements for the application. Laminated safety glass is made by bonding two sheets (201 & 202) of annealed glass 2 together using a plastic bonding layer comprised of a thin sheet of transparent thermo-plastic 4 (interlayer) as shown in FIGS. 1A and 1B.

The glass layers may be annealed or strengthened. There are two processes that can be used to increase the strength of glass. They are thermal strengthening, in which the hot glass is rapidly cooled (quenched) and chemical tempering which achieves the same effect through an ion exchange chemical treatment.

A wide range of coatings, used to enhance the performance and properties of glass, are available and in common use. These include but are not limited to anti-reflective, infrared reflecting, hydrophobic, hydrophilic, self-healing, self-cleaning, anti-bacterial, anti-scratch, anti-graffiti, anti-fingerprint, and anti-glare. Methods of application include Magnetron Sputtered Vacuum Deposition (MSVD) as well as others known in the art that are applied via pyrolytic, spray, Controlled Vapor Deposition (CVD), dip, sol-gel, and other methods.

The glass layers are formed using gravity bending, press bending, cold bending or any other conventional means known in the art.

The plastic bonding layer 4 (interlayer) has the primary function of bonding the major faces of adjacent layers to each other. The material selected is typically a clear thermoset plastic. For automotive use, the most used plastic bonding layer 4 (interlayer) is polyvinyl butyral (PVB).

PVB has excellent adhesion to glass and is optically clear once laminated. It is produced by the reaction between polyvinyl alcohol and n-butyraldehyde. PVB is clear and has high adhesion to glass. In addition to polyvinyl butyl, ionoplast polymers, Ethylene Vinyl Acetate (EVA), Cast in Place (CIP) liquid resin and thermoplastic polyurethane (TPU) can also be used.

A wide variety of films are available that can be incorporated into a laminate. The uses for these films include but are not limited to solar control, variable light transmission, increased stiffness, increased structural integrity, improved penetration resistance, improved occupant retention, providing a barrier, tint, providing a sunshade, color correction, and as a substrate for functional and aesthetic graphics. The term "film" shall include these as well as other products that may be developed or which are currently available which enhance the performance, function, aesthetics, or cost of a laminated glazing.

While the focus of the discussion and embodiments is on large roofs this not to be taken as a limitation. The disclosure may be implemented in any other glass position of the vehicle.

The light scattering layer is comprised of a graphic printed using a nanoparticle ink () which alters the reflectivity of the glass surface by fusing to it and/or altering the index of refraction at the point of contact between the nanoparticle and the glass surface. Alternately the light scattering layer can be made by various surface treatments which alter the physical surface of the glass which include but are not limited to sand blasting, laser etching and chemical etching.

The light-conducting layer is one of the glass layers of the laminate and in fact could also be described as a light guide. However, as a light guide may advantageously be used to inject the light from the light source, we shall refer to this glass layer as a light-conducting layer rather than a light guide to avoid any confusion between the two. The light conducting glass layer is optimally made from a low-iron, high visible light transmission, ultra-clear glass. Additional functional coatings can be deposited on the light conductive layer.

As an example, an $SiO_2$ coating can be applied to the light conductive layer, by means of an MSVD process, on a surface internal to the laminate. The coating has an index of refraction that is substantially less than that of glass and serves as an optical isolator layer isolating the light inside of the light conductive layer. The coating is applied to the major surface of the light guide layer internal to the laminate. The coating may be applied to the entire surface or just to the portion containing the light scattering graphic.

As can be appreciated, a means to facilitate the insertion, alignment and retention of the light strip in the cavity is needed. We shall refer to this as the sliding means. A number of methods may be used to construct the sliding means of the disclosure.

The sliding means may be provided by forming the cavity with features designed such that the light strip can be easily slid into the cavity and secured in the correct alignment. A sliding means, comprising one or more slots or other geometric features, may be provided in the cavity into which the light strip inserted. The light strip may have a mating feature allowing the light strip to be slid into the cavity, aligned, and held in place. The features may include but are not limited to rectangular, U shaped, C shaped, trapezoidal and rounded cross-sectional features. The feature may take the form of a tongue and groove, rabbet, dovetail or other.

The features may be formed in the plastic of the encapsulation and/or by means of an embedded insert. Inserts may be placed inside of the encapsulation mold which subsequently become embedded in the plastic and a permanent adhered to the glazing.

Figure 10A:
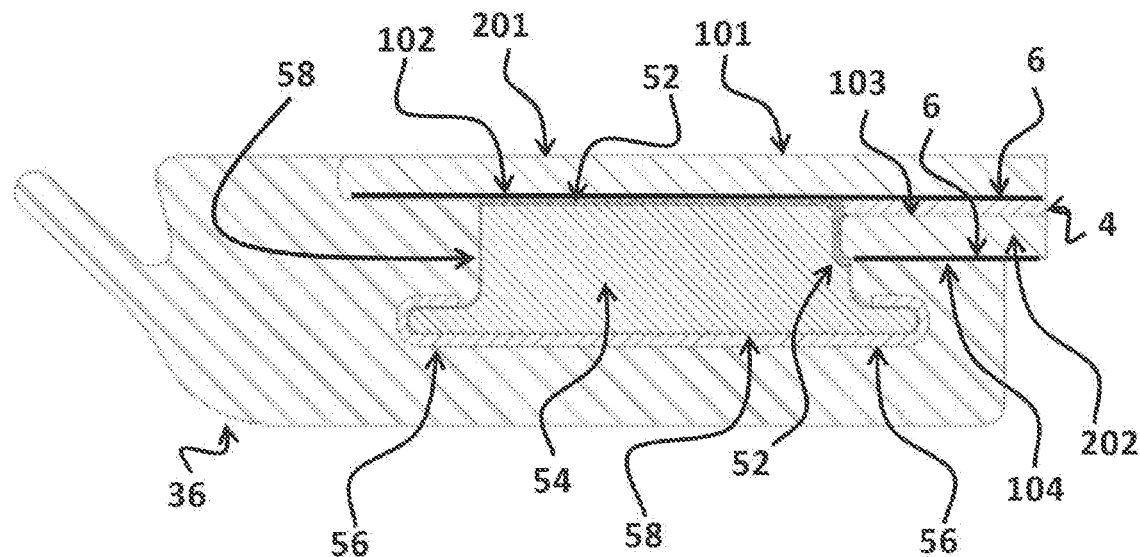
FIG. 10A Cross section showing and encapsulation with core and sliding insert.
Figure 10B:
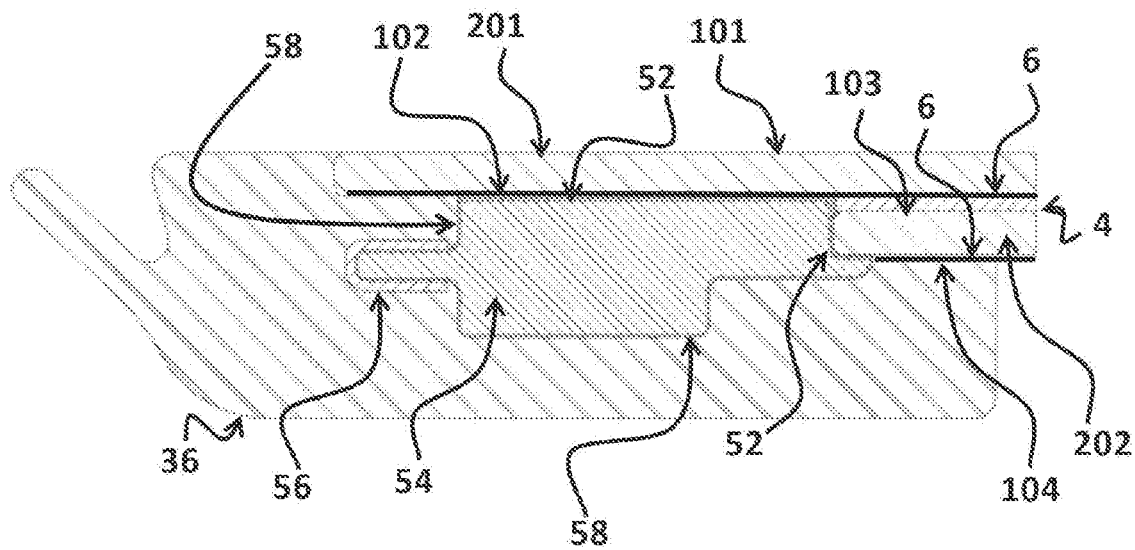
FIG. 10B Cross section showing and encapsulation with core and sliding insert.

While a slot or other feature can be created in the plastic of the encapsulation itself, some plastics have a high coefficient of friction and are relatively soft and susceptible to gouging. Installation of the light strip 28 can be facilitated by the addition of a sliding means insert to the mold. The insert is applied to the core or mold and held in place, if needed by an adhesive that can be easily separated from. In FIGS. 10A and 10B, cross sections are shown of the cavity of the disclosure with the core 54 and sliding means inserts 56. The core 54 is bonded to surfaces two 102 and four 104 as well as to the edge of glass of the inner glass 202 layer but a low tack water soluble adhesive 52. The core is coated with a release coating or compound 58. The sliding means inserts 56 become embedded in the injected plastic and remain when the core is removed.

Optionally, the insert is not embedded in the encapsulation and can be fix to the encapsulation after the encapsulation process. The insert can be fabricated from any suitable material. The disclosure can also comprise more than one insert acting together as sliding means. A typical sliding means insert is implemented with an aluminum or rigid plastic extrusion.

Figure 17A:
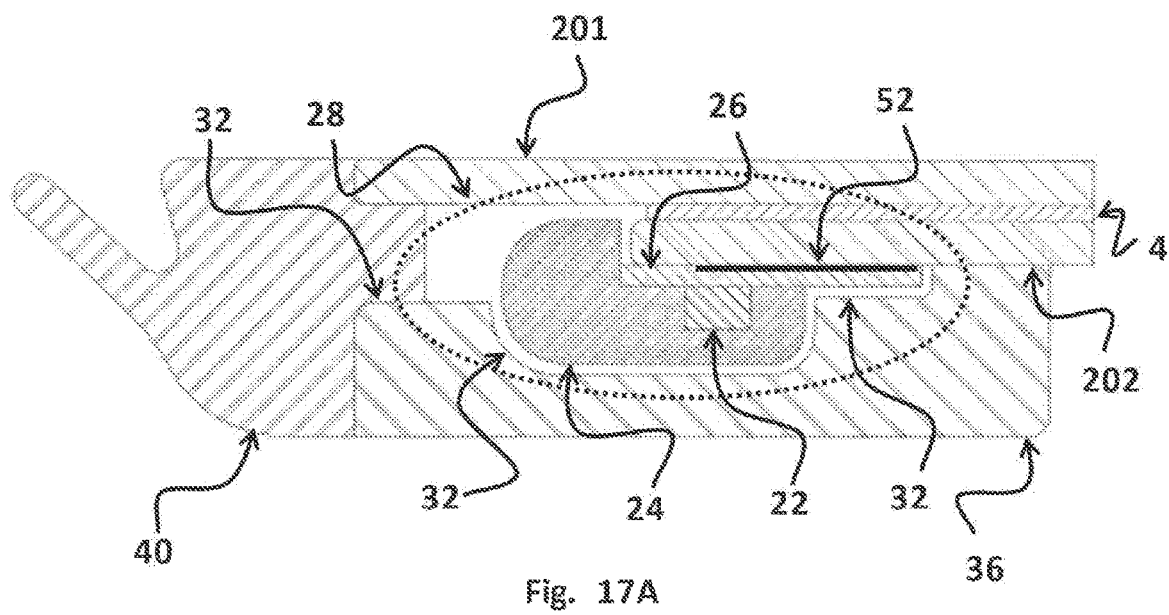
FIG. 17A Cross section of open edge encapsulation with light strip inserted and light strip bonded to surface four of the inner glass layer and plug bonded to edge of glass.
Figure 17B:
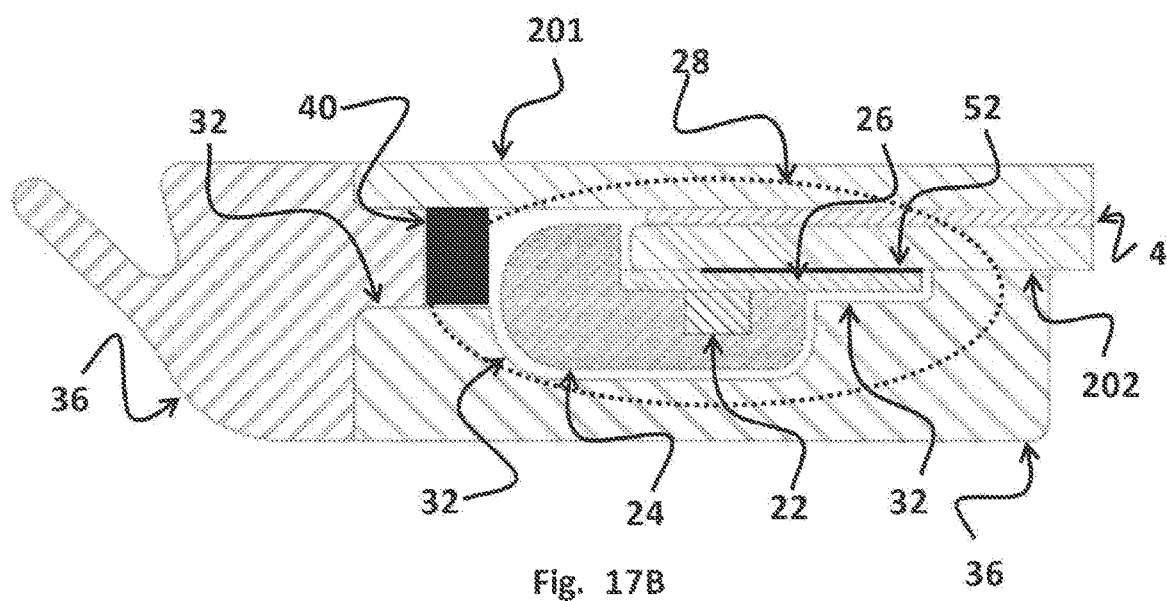
FIG. 17B Cross section of open edge encapsulation with light strip inserted and light strip bonded to surface four of the inner glass layer and plug sealing cavity and a second encapsulation.
Figure 20A:
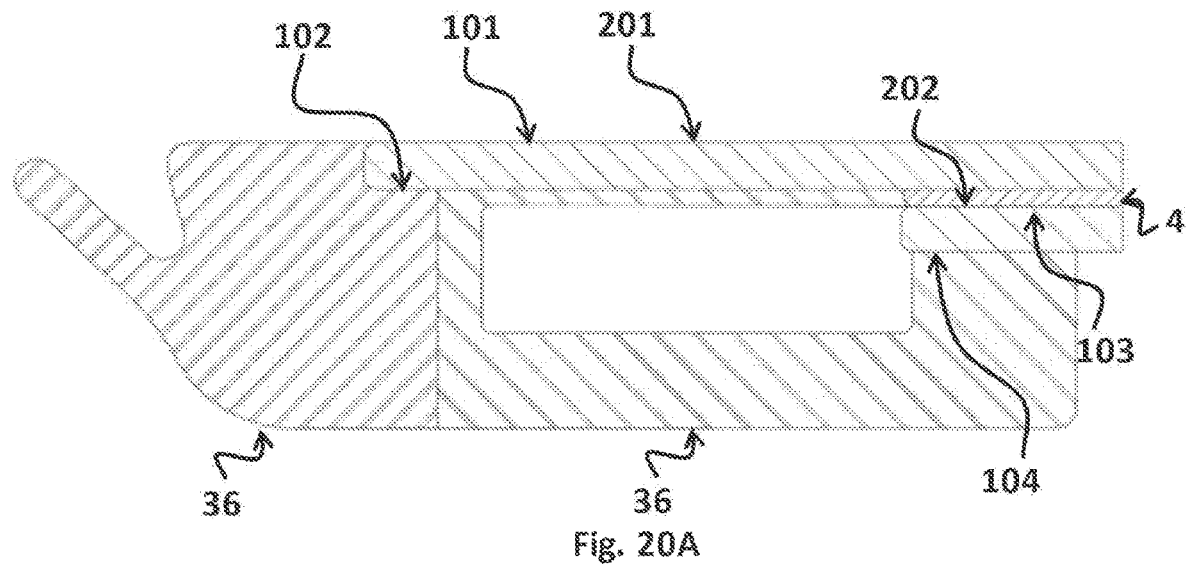
FIG. 20A Cross section of a two-step encapsulation with surface two covered by encapsulation.
Figure 20B:
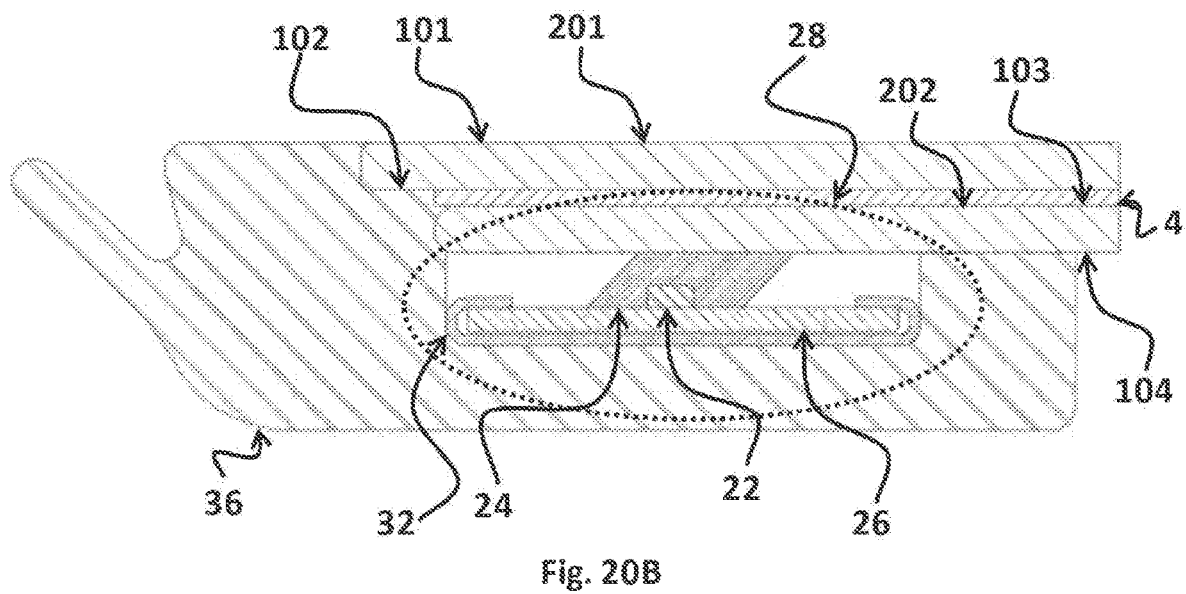
FIG. 20B Cross section of encapsulation with surface four light injection.
Figure 22:
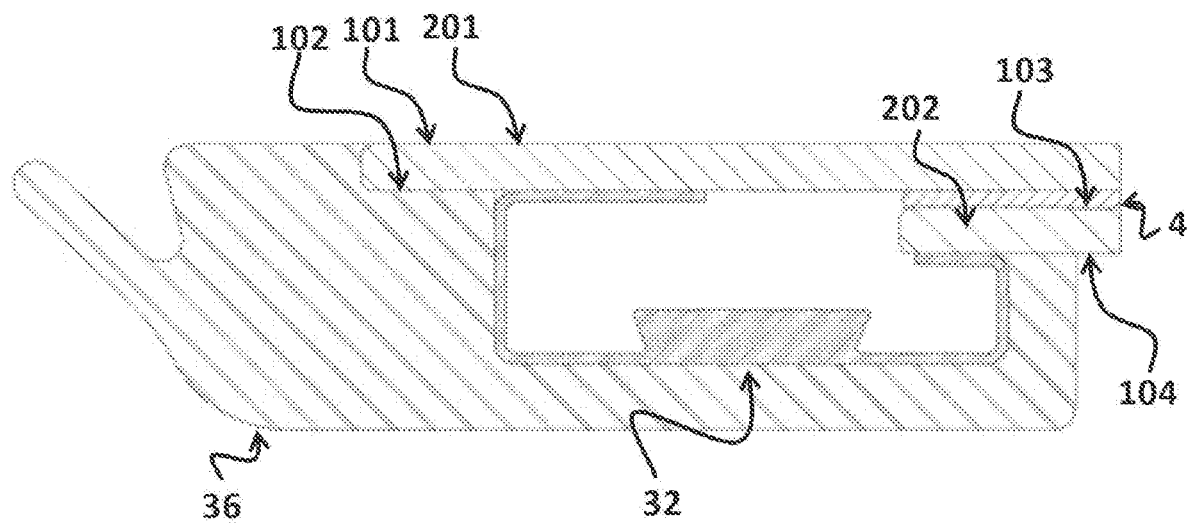
FIG. 22 Cross section with sliding means bracket bonded to surface two.

Cross section with sliding means created in the plastic of the encapsulation itself are shown in FIGS. 17A and 17B. Cross sections with sliding means inserts are shown in FIGS. 4, 5, 6, 7, 8, 10A, 10B and 11. Cross sections with sliding means fix to the encapsulation after the encapsulation process are shown in FIG. 20B. Cross sections with sliding means fix to the encapsulation and to the glass before the encapsulation are shown in FIG. 22. These are examples of some possible configurations and as such are not to be construed as limitations. A wide array of combinations and shapes may be used in addition to those illustrated.

Figure 21A:
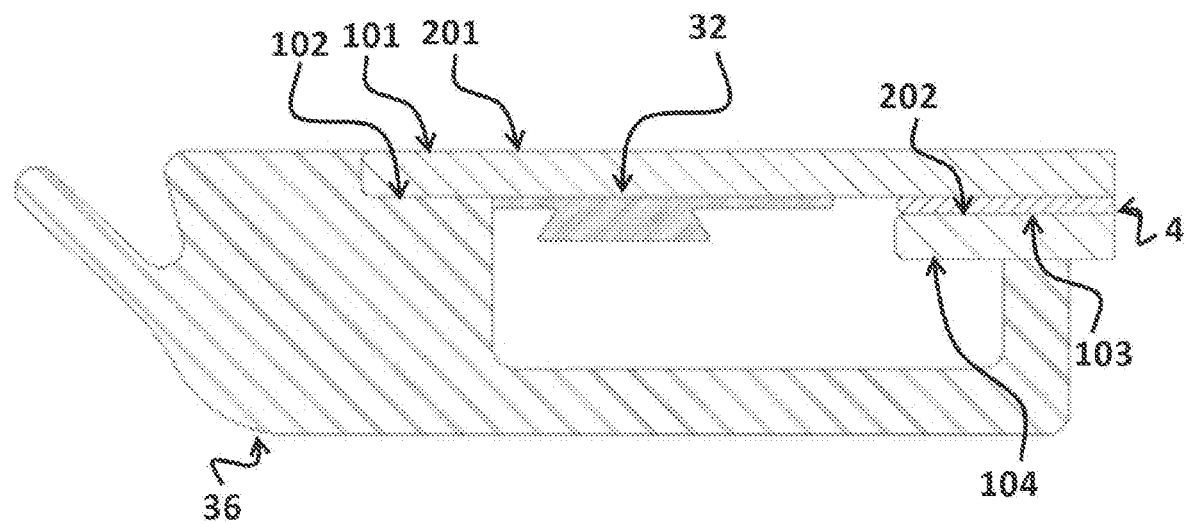
FIG. 21A Cross sections with sliding means fix to one of the glass layers.
Figure 21B:
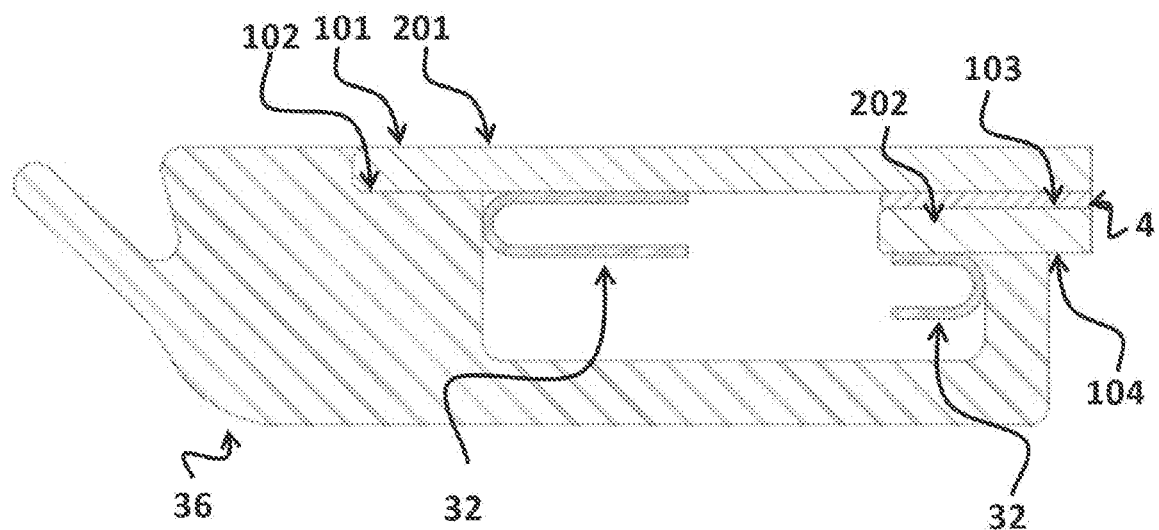
FIG. 21B Cross sections with sliding means fix to one of the glass layers.

The sliding means can also be provided as a mechanical feature with suitable design to be fixed to at least one of the glass layers. In this case, the features may include but are not limited to rectangular, U shaped, C shaped, trapezoidal, and rounded cross-sectional features. The feature may take the form of a tongue and groove, rabbet, dovetail or other. The mechanical feature can be fix to the glass by adhesive or mechanical procedures, and can be provided, before or after the encapsulation process. Cross sections with sliding means fix to one of the glass layers are shown in FIGS. 21A and 21B. These are examples of some possible configurations and as such are not to be construed as limitations. A wide array of combinations and shapes may be used in addition to those illustrated.

The light strip may be equipped with a spring to maintain tension against the cavity walls after installation as shown in FIGS. 6, 12, 14A, 14B and 15. The spring may be attached to the light strip or implemented as an insert imbedded in the encapsulation. When combined with a cavity into which the light strip precisely fits and into which the light strip can be easily slid into, the spring and light strip combination may be considered as a sliding means.

The sliding means may be implemented in whole or in part as a feature of the light strip. The sliding means implementation will vary with the specific configuration of each glazing and can comprise any combination of the above mentioned. The sliding means can fix the position of the light strip inside the cavity by themselves, so called self-supporting sliding means. Optionally, a suitable adhesive can be provided to the required surface of the strip before or during the sliding thereof, for fixing purposes inside the cavity.

The light strip may be segmented comprising more than one module interconnected to each other. The light strip may comprise a flexible substrate, a rigid substrate, or a combination of both rigid and flexible substrates. The light strip is a circuit board populated by surface mounted light source, typically light-emitting diodes (LED) either side-emitting or top-emitting and other components such as drivers, capacitors inductors, resistors, etc. The board can be a flexible printed circuit (FPC) or a printed circuit board (PCB). The light strip might or might not be fixed to the light guide, if any. The light strip might or might not come with an adhesive backing that would help the heat transfer.

While the focus of the disclosure and discussion is on LEDs, any suitable equivalent light source may be substituted and used in place of the LEDs of the described embodiments of this disclosure without departing from the concept of the disclosure. Any means that can provide the intensity and meet the packaging requirements may be utilized including, incandescent, halogen, fiber optics, light pipes and even means not yet invented. Further, any combination may be used. The lighting means may comprise a light source located separate from the light injection assembly and delivered by means of a light guide.

The light emitted may be visible, invisible or a combination of visible an invisible. The type of light emitted by the light emitting means of the disclosure includes but is not limited to collimated, uncollimated, white, monochromatic, infra-red, ultra-violet, multi-wavelength light or any combination depending upon the application.

We shall use the word inject to describe the process of introducing light into the glazing wherein the glazing acts as a light conductive layer for the light. The light injection means must direct the light at a specific angle or range of angles. The light injection assembly may be integrated and combined with as a part of a molding, frame, housing, bracket, encapsulation, or trim. The area on the light conducting layer where the light is injected is the light injection point or area.

With respect to light injection, the angle of injection as discussed is the theoretical angle that a perfect single ray traveling through a perfect optical path would make with respect to the major surface normal. In practice, all of the photons will not be at the exact angle desired, but a substantial portion will be at or within a tolerance at which the TIR will occur.

The angle of the injected light must be greater than the critical angle for TIR to occur. This critical angle is the smallest angle of incidence at which total internal reflection occurs. The critical angle is a function of the refractive index of the two media that the light passes through. For soda-lime glass and air the critical angle is 40.81 degrees.

In most of the Figures and embodiments, light is injected into the light conducting layer at the edge of glass. At this point, the angle of incidence is at or near zero and all of the light is injected. However, as the light is perpendicular to the normal of the major surfaces total internal reflection occurs. If we were to inject light into surface two or surface four normal to the surface, the light would pass though the glazing with no reflection. In FIG. 20B, a light guide is used to collimate the light from the LED and to inject it at the critical angle so that total internal reflection occurs. This also has the added benefit that the edge of glass offset is not required as the light is not injected at the edge of the light conducting layer.

The length of the light strip, curvature as well as the design of the encapsulation are all important parameters. Perhaps the most important is the size and locations of the opening or openings though with the light strip needs to be slide though into the cavity.

Figure 3:
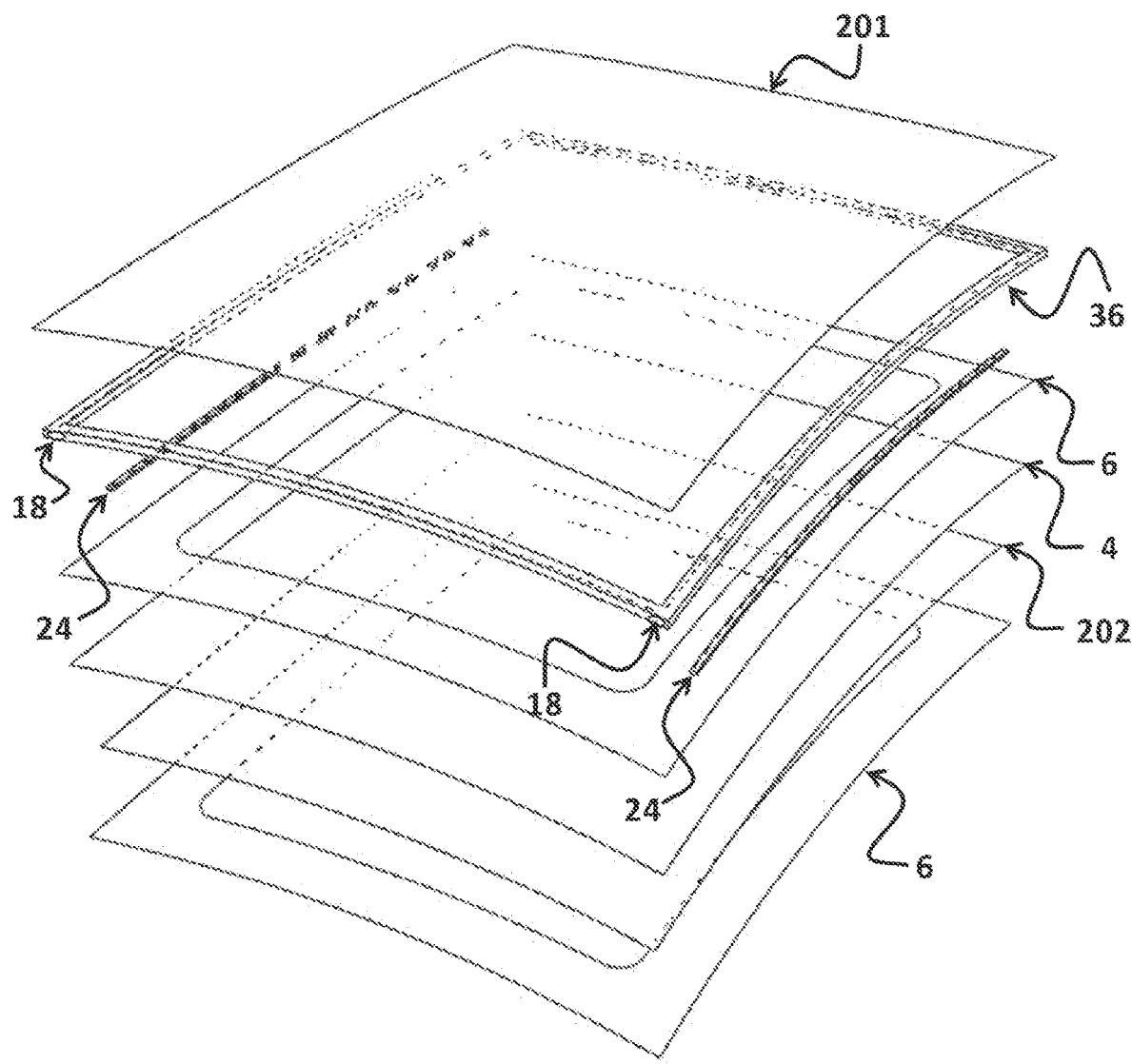
FIG. 3 Exploded view of an encapsulated illuminated automotive glazing panoramic roof.
Figure 4:
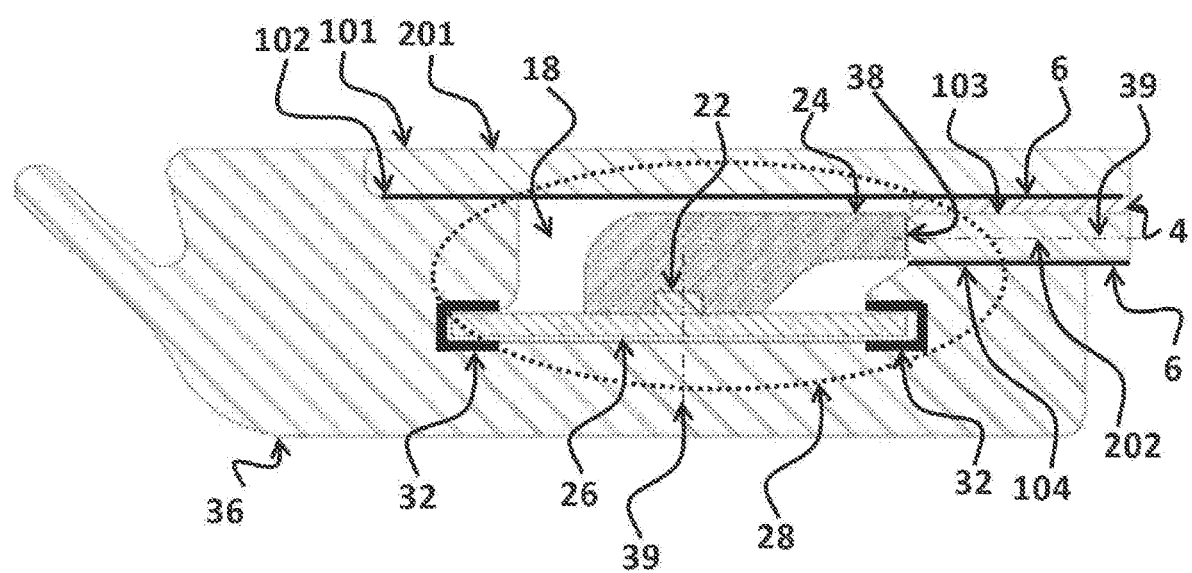
FIG. 4 Cross section showing "U" profile encapsulation with bottom mount light strip and 90-degree angle between edge of glass and LED centerlines.

We have two generic configurations for the cavity openings. The cavity must have at least one opening. In FIGS. 3, 4, 5, 6, 7, 8, 10A, 10B, 11, 12, 20A and 20B, various aspects of encapsulated laminates in which the cavity is closed along the length of the cavity. FIGS. 3 and 4 show the cavity running the length of the panoramic roof with openings at opposite ends of the encapsulation. This type of configuration shall be referred to as an end opening cavity.

In FIGS. 13A, 13B, 14A, 14B, 15, 16A, 16B, 17A, 17B, 18A, 18B, 19, various aspects of encapsulated laminates in which the encapsulation comprises openings along the length of the cavity. This type of configuration shall be referred to as a side opening cavity.

The sliding means maybe different for a side opening cavity versus an end opening cavity. With an end opening, one end of the light strip is inserted into one end of the cavity. With a side opening cavity, one side of the light strip is inserted along the length of the cavity.

Figure 18A:
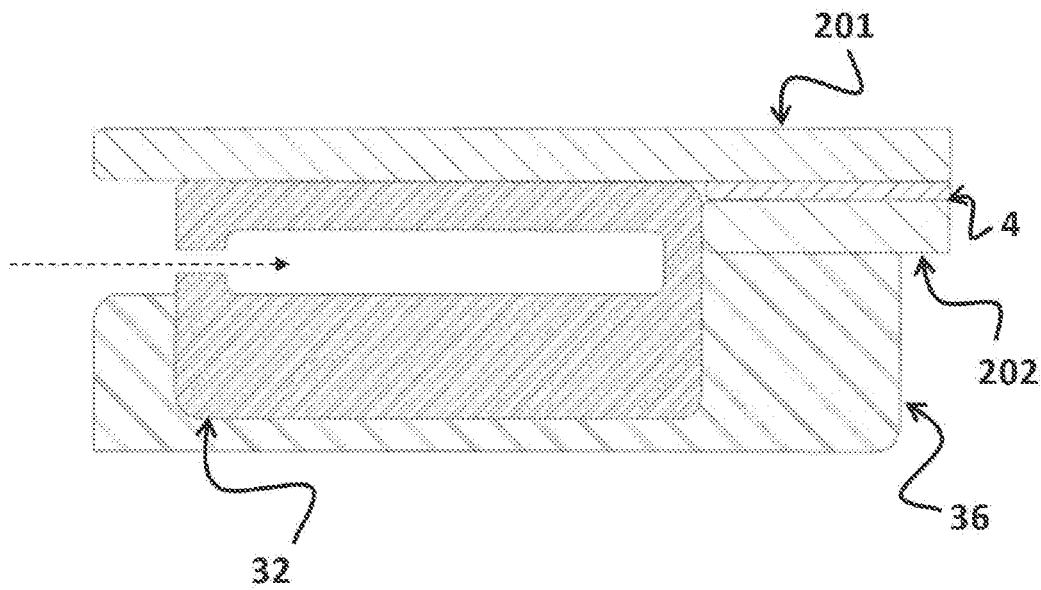
FIG. 18A Cross section of an open side C profile encapsulation with a side sliding means insert.
Figure 18B:
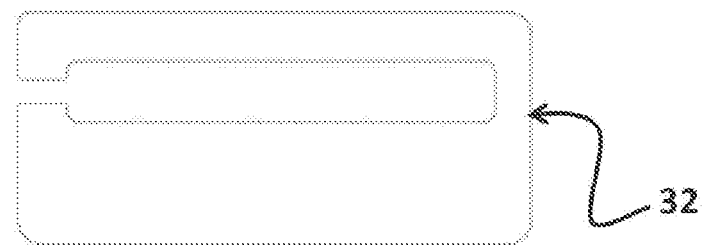
FIG. 18B Side view of the side sliding means insert of FIG. 18A.
Figure 19:
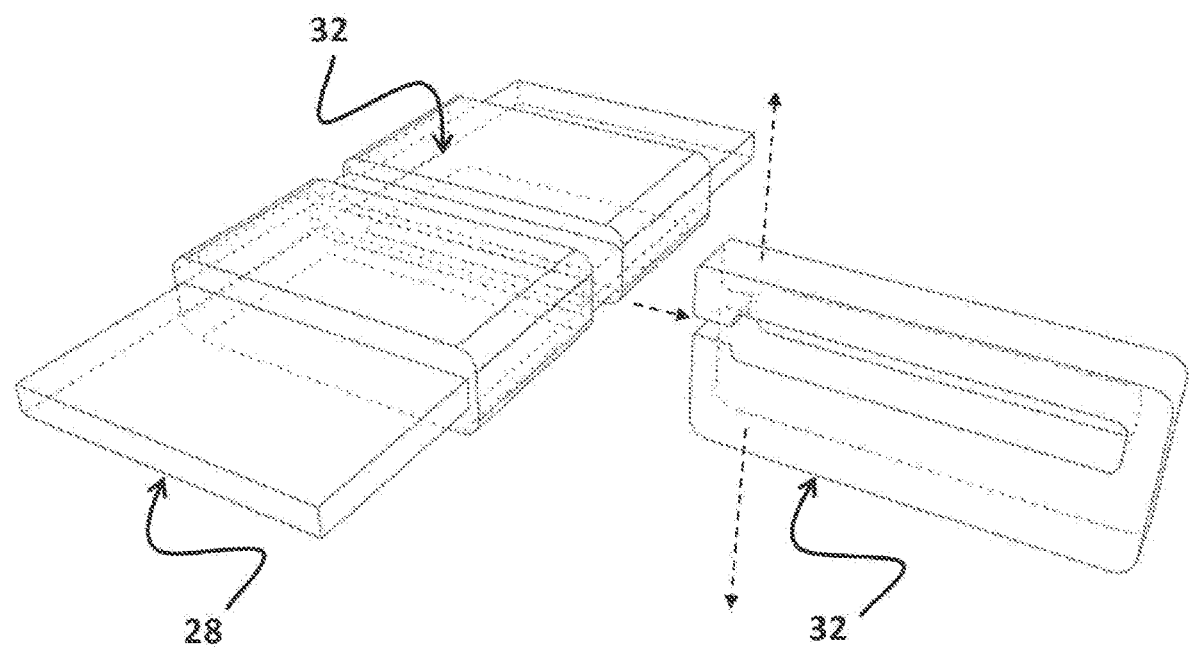
FIG. 19 Isometric view of the light strip with male side sliding means and the female sliding means insert.

An example of sliding means used with a side open cavity is shown in FIGS. 18A, 18B and 19. Female sliding means inserts (32 FIG. 18B) are inserted into the mold along with the segmented core and embedded in the encapsulation. The side opening light strip 28 is also segmented with a male mating component (32 FIG. 19) at each point corresponding to the female sliding means insert in the encapsulation. The plastic of the encapsulation deflects as the light strip 28 is slid into position. Once seated the mating male/female insert and component securely align and retain the light strip 28 in position. The cavity is subsequently closed by means of a plug in the form of a molding bonded to the encapsulation of by a second encapsulation.

The hollow cavity in an injected molded part can be produced by using a removable core. The core e may be reusable or used only once. A single use core may be constructed from a sacrificial material. Relatively simple cavities, adjacent to the exterior walls of the injection molded article, can be produced by simply machining the shape into the wall of the mold. If the cavity to be produced is shaped such that it is locked in by the plastic that is injected, making it difficult or impossible to remove from the mold without damage, a removable core must be used. The core is designed to the shape of the cavity and then suspended within the mold. To produce a cavity in an injected molded plastic the core must be made of a material that does not react with and that will not adhere to the plastic. Silicone elastomers have proven to work well. The plastics typically used for automotive glazing encapsulation do not adhere to silicon elastomers. An added benefit is that the elastomers are strong and elongate when stretched making it easy to remove the core from the molded part. Other types of material may also be used including materials that may be removed by means including but not limited to air-pressure, water pressure, abrasion, abrading, vacuum, dissolving in solvent or melting or any combination thereof.

The core 54 must cover the glass surface that will be used for light injection protecting it from being covered by the encapsulation 36. The core may be equipped with ribs, bosses, or other features to hold it in place. The core may be adhered to the glass by a low tack adhesive that can subsequently be easily removed.

Figure 8:
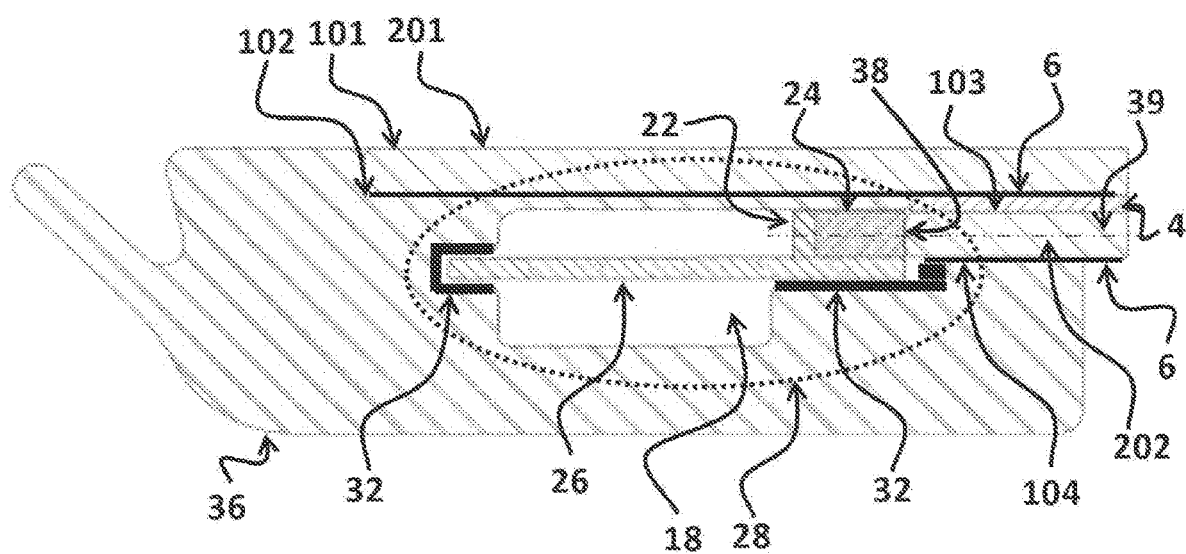
FIG. 8 Cross section showing "C" profile encapsulation with bottom mount light strip and 90-degree angle between edge of glass and LED centerlines.
Figure 9A:
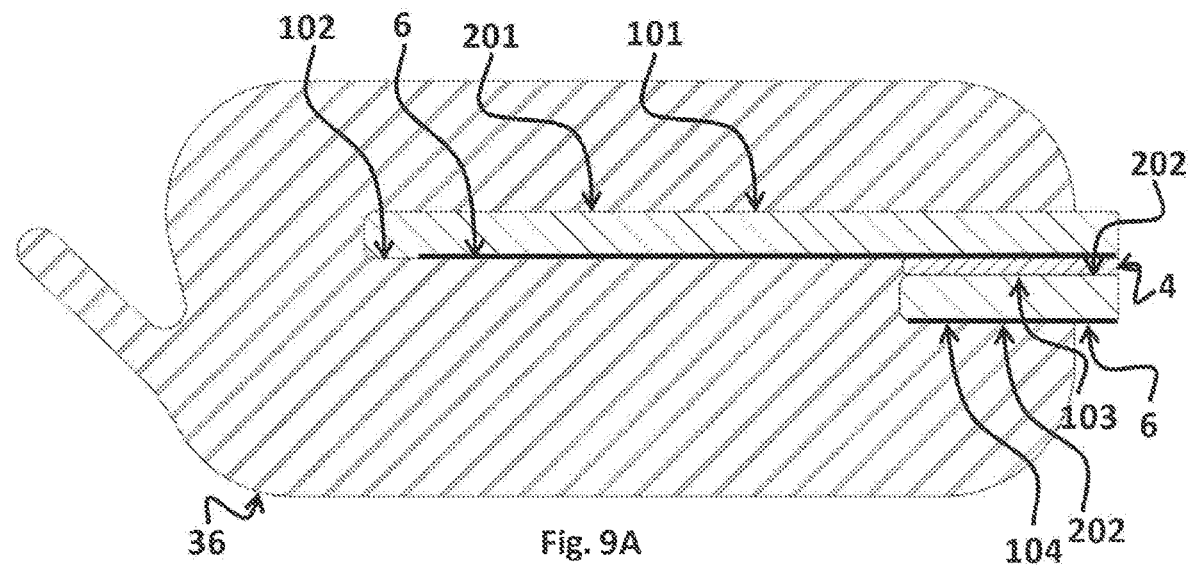
FIG. 9A Cross section showing a non-flush encapsulation.
Figure 9B:
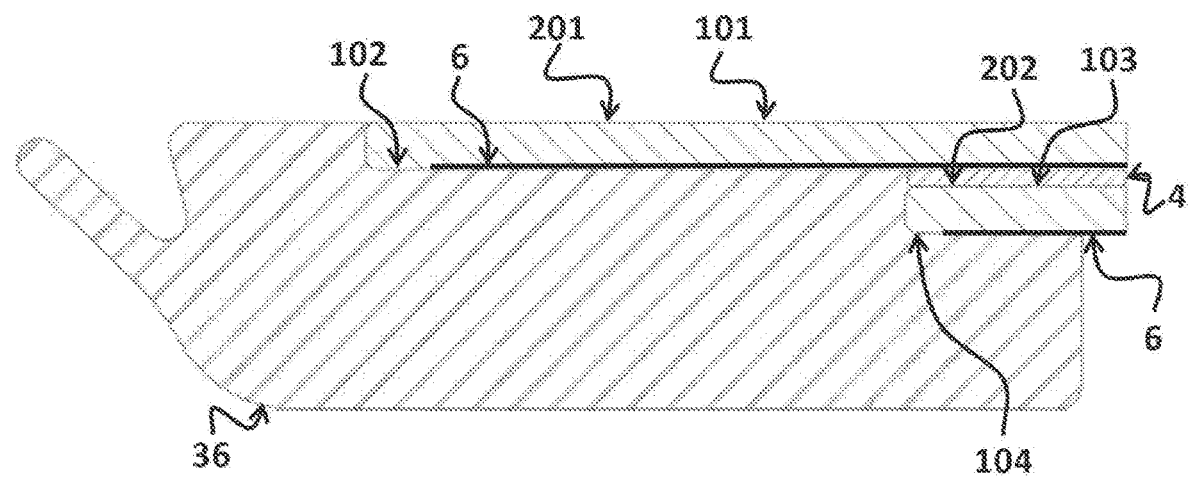
FIG. 9B Cross section showing a flush encapsulation.

The plastic of the encapsulation must form a strong bond to the glazing and over a sufficient area to meet all physical requirements. A portion of the glass area may be exposed, or the entire glass are other than the portion that must be left exposed may be covered by the plastic. FIG. 8 shows an encapsulation covering surface two and surfaces four. In FIG. 20A, a cross section is shown of an encapsulation covering surfaces two and four with a first encapsulation and an outboard portion formed in a second encapsulation step.

Figure 2:
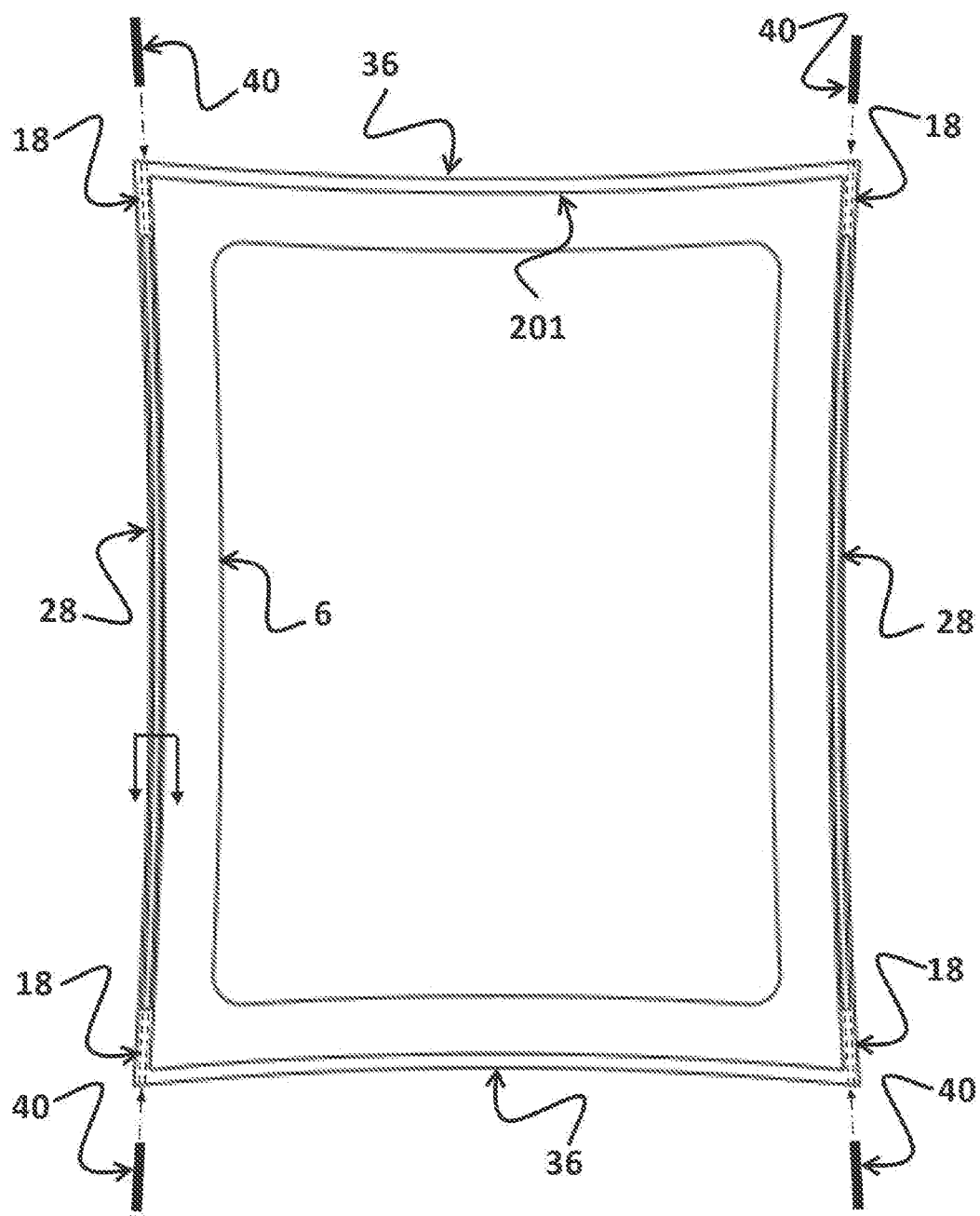
FIG. 2 Top view of an encapsulated illuminated automotive glazing panoramic roof.

The cavity 18 resulting from the core 54 must have at least one opening though which the core can be removed and the light strip 28 inserted. In FIGS. 2 and 3, each cavity runs the entire length of the glazing along the fore-aft sides with openings at each end of the cavity. This facilitates removal of the core and allows for the cavity to be easily cleaned. The light strip 28, if sufficiently stiff, may be inserted and slid into the cavity. Alternately, a wire can be passed through the length of the cavity, adhered to the light strip 28, and then used to pull the light strip 28 though the cavity and into position.

The cavity may have openings at both or either end or anywhere along the length of the cavity. The cavity may have an opening running the length or some portion of the length of the cavity.

The cavity may be partially formed during encapsulation and then completed by the addition of a bonded component or by means of a second encapsulation. A two-step process of encapsulation process may be required to form some more complex shapes or to provide some added functionality. Sometimes, it may be necessary to use materials with different properties for various parts of the encapsulation. We may choose to use a hard and stiff plastic for one portion of the profile and a softer rubber like elastomer for another. For a two-step process encapsulation, the use of a removable core maybe not required.

After the glazing has been encapsulated and the light strip 28 has been slid into the cavity, the openings to the exterior of the cavity must be closed to provide the IP67 level of environmental protection required by the light strip 28. A plug 40 is used for this purpose as shown in FIG. 2. The term plug applies to any means, removable or permanent that serves to provide a watertight seal. The plug means includes but is not limited to an adhesive, a cavity shaped plug with an O-ring, an expansion plug, and a threaded plug with a mating female threaded insert molded into the encapsulation.

If the light strip 28 does not run the entire length of the glazing or a substantial portion of the length, it may not be desired to have the cavity extend the entire length. In this case, the cavity will have an opening in just one end and a blind hole. Advantageously, the light strip 28 may be flexible enough to slide inside the cave from different angles. In another embodiment, the cavity may be formed with the opening along the length of the cavity. Cross sections showing this type of cavity are illustrated in FIGS. 13A, 13B, 14A, 14B, 15, 16A and 16B. with the opening along the length of the cavity, the light strip 28 may be slide into place through the opening along the length and the sliding means designed for this type of installation. If the gap in the opening is sufficiently narrow, an adhesive may be used as the plug to seal the cavity opening. Otherwise, some other type of plug must be used.

In some of the embodiments, a length of a longitudinal insert is adhered to the walls of the opening for sealing purposes and then a second encapsulation cycle is used to complete the profile.

In some of the embodiments, the rectangular insert is removed after the encapsulation and the cavity is closed off by the second encapsulation which serves as a plug.

The glass surface into which the light is injected must be protected from being covered by the encapsulation. The encapsulation may completely or partially cover the balance of the glass surfaces not left exposed for light injection. FIGS. 4, 5, 6, and 7 show the cross sections of an encapsulation having a characteristic "U" profile wherein surface two 102 of the offset outer glass layer 201 is not covered by the encapsulation. In FIG. 8, surface two is encapsulated with an-and the light injection surface of glass layer two 202 exposed and not covered by the encapsulation. This is a "C" profile.

Figure 11:
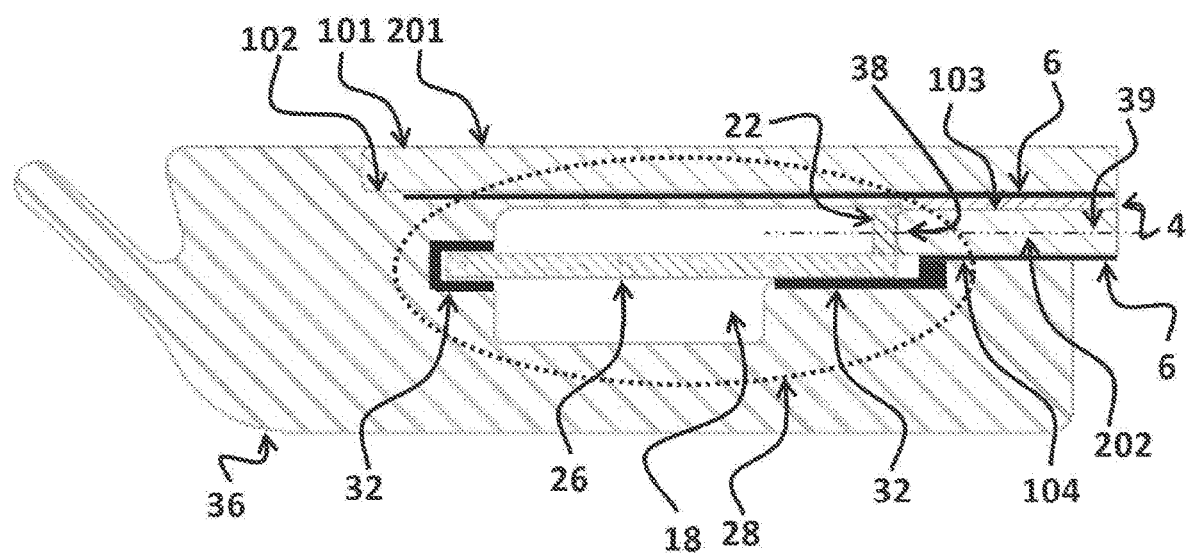
FIG. 11 Cross section of encapsulation with LED adjacent to the glass edge and no light guide.

As discussed, for total internal reflection to occur once the light in injected into the glass, the angle of incidence relative to the surface normal for an air/glass interface must be no greater than approximately 41 degrees. At greater angles, the light will pass through the glass and be lost. However, the bare LED die acts as a point source emitting light uniformly in all directions. The LED die mounted to a circuit board will emit in a half spere over 180 degrees. As such, only a portion of the light will be at the angle needed. We can partially improve the efficiency by aligning the centerline 39 of the light emitting surface of the die with the surface normal at the target injection point on the surface of the glass. We can also improve efficiency by mounting the LED die in close proximity to the glass injection surface and with the centerline 39 of the light emitting surface aligned with the glass surface normal as shown in FIG. 11.

However, much of the light will still be wasted passing through or being absorbed by the black obscuration due to the varying angles of incidence.

A light guide may advantageously be used to guide the light emitted by each LED to the point on the surface of glass where the light is to be injected. The light guide functions in the same manner as a fiber optic utilizing total internal reflection to deliver the emitted light to the injection point on the glass surface. The light guide serves to collimate the light from the LED and inject it into the surface at a low angle relative to the surface normal, guaranteeing that most all of the light will be injected.

The light from the LED die, is emitted in all directions. The light is reflected by the walls of the light guide multiple times until it is directed in towards of an aperture where the light is decoupled and emitted. The light is thus mixed becoming homogenous and improving the efficiency of the light injection. In this manner, the LED die orientation may be selected such as to facilitate the design of the light strip 28. The surface normal of the light emitting surface of the LED die may be in direct alignment of the surface normal of the glass surface at the injection point or at any other angle including a full 180 degrees. Likewise, the die does not need to be mounted directly to the glass surface injection point or even very close which can improve thermal management. The beam can also be shaped so at to couple over a larger surface area than would be otherwise possible improving light distribution and consistency.

Using a light guide, the path of light from the LED die light emitting surface to the surface normal at the injection point on the glass need not be aligned. The centerlines 39 may be offset. In fact, any LED die orientation and alignment may be used as best suites the application. As an extreme example, the light emitting surface of the LED die can emit light 180 degrees from the injection point surface. The LED die also can be located further from the glass surface.

The light guide may be fabricated from a transparent plastic. The light guide must either be coated with or embedded in a second material with a lower index of refraction than the material that the light guide is made from or be surrounded by a media with a lower index of refraction. For common transparent plastics, total internal reflection will occur with the light guide in air as well as a number of liquids.

For some applications, rather than using a transparent media to surround or coat the light guide, the light guide may be partially coated with a highly reflective material rather than relying upon total internal reflection.

As discussed, thermal management is an issue when the light strip 28 is overmolded with plastic. Improved thermal management, another advantage of the disclosure, comes from the fact that the average cross-sectional area of the light strip 28 must be less than that of the cavity and will often be substantially less. Often the light strip 28 cross sectional area will be 20% to 80% less than that of the cavity.

This leaves a relatively large void inside of the cavity. This can be used to add a heat sink or heat dissipating material 30 to the light strip 28. Convective cooling from the air inside of the cavity, will help to reduce component temperature. If needed, a gaseous or liquid coolant can be circulated within the cavity.

In FIGS. 17A and 17B, the light strip 28 is bonded to surface four of the glass. In this way, the glass is used as a heat sink. The adhesive used must not interfere with the sliding means. If the cavity is side opening, this is not a problem. The adhesive can be applied prior to the side insertion of the light strip 28. For end opening cavities, there are a number of options. A thermo activated adhesive can be used with heat applied after assembly. A specially designed applicator can be used that will dispense a precise amount of adhesive along the inside of the cavity where the edge of the light strip 28 will nest.

The present disclosure can be manufactured by two different methods.

The first method comprises:
Providing an injection molding machine, a mold, a glazing, at least one light strip, at least one core
Attaching said core to said glazing
Placing glazing with core into said mold.
Using said injection molding machine to inject plastic into and filling said mold.
Allowing plastic to cool.
Removing glazing from said mold.
Removing said core from encapsulation.
Providing sliding means
Sliding light strip into sliding means.
Inserting plug in each cavity opening.

Optionally, the first method can further comprise providing sliding means insert as follows:
Providing an injection molding machine, a mold, a glazing, at least one light strip, at least one core, and at least one sliding means insert.
Attaching said sliding means insert to said core.
Attaching said core to said glazing.
Placing glazing with core and sliding means insert into said mold.
Using said injection molding machine to inject plastic into and filling said mold.
Allowing plastic to cool.
Removing glazing from said mold.
Removing said core from encapsulation.
Providing sliding means
Sliding light strip into sliding means.
Inserting plug in each cavity opening.

The second method comprises:

Providing an injection molding machine, a mold, a glazing, at least one light strip, the mold being designed to generate a cavity in the encapsulation
Placing glazing into said mold.
Using said injection molding machine to inject plastic into and filling said mold.
Allowing plastic to cool.
Removing glazing from said mold.
Sealing the cavity generated by the first encapsulation
Providing a second injection molding machine and a second mold
Placing the glazing with the first encapsulation into the second mold
Removing glazing from said mold.
Providing sliding means
Sliding light strip into sliding means.
Inserting plug in each cavity opening.

Optionally, the second method can further comprise providing sliding means insert as follows:
Providing an injection molding machine, a mold, a glazing, at least one light strip, the mold designed to generate a cavity in the encapsulation, at least one sliding means insert.
Placing glazing and sliding means insert in said mold into said mold.
Using said injection molding machine to inject plastic into and filling said mold.
Allowing plastic to cool.
Removing glazing from said mold.
Sealing the cavity generated by the encapsulation
Providing a second injection molding machine and a second mold
Placing the glazing with the first encapsulation into the second mold
Removing glazing from said mold.
Providing sliding means
Sliding light strip into sliding means.
Inserting plug in each cavity opening.

DESCRIPTION OF EMBODIMENTS

All embodiments disclosed are based upon the large panoramic roof illustrated in FIGS. 2 and 3. The overall dimensions of the roof are 1200 mm by 800 mm. The outer glass layer 201 is comprised of a dark solar green soda-lime glass 2 and has a thickness of 3.2 mm. The inner glass layer 202 is comprised of 2.2 mm thick ultra-clear soda-lime glass 2. A dark grey PVB 4 is used to laminate the two glass layers together. The total visible light transmission of the laminate is 20%. The outboard edge of the inner glass layer 202 is offset inboard by 20 mm from the outboard edge of the outer glass layer 201 around the entire periphery. The edge of glass on both layers is ground and polished. A black frit obscuration is printed on surfaces two 102 and four 104. A light dispersing ink is used to screen print a graphic pattern on surface three 103 of the inner glass layer 202. The glass layers are press bent to shape.

The bent glass layers are laminated and then inspected for any defects. The laminate is then encapsulated.

Metal sliding means inserts are applied to the silicon rubber cores 54. The set of cores 54 are then bonded to the glass with a water-soluble adhesive 52 and then coated with a release coating or agent 58. The cores run the entire length, of the sides of the encapsulation to create an opening at each end of the cavity. The glazing with the attached cores is placed into the mold and clamped in place. A thermo-plastic, heated to 100 C, is injected into the mold encapsulating the entire periphery. The mold is cooled for two minutes after which the mold opens. After removing the encapsulated glazing from the mold, the cores are removed by simply pulling on them. The thermo-plastic does not adhere to the silicon rubber. As the rubber is stretched it elongates and the cross-section becomes smaller further facilitating removal. The cavity is flushed to remove any debris and the water-soluble adhesive. The light strips 28 of the various embodiments are then engaged with the sliding means inserts and slid into place. Plugs 40 with O-rings are inserted into the cavity openings. The light strip 28 electrical cable is routed through a channel in the plug completing the assembly. With robotic load/unload, 20 parts can be produced per hour.

1) Embodiment 1 is shown in FIG. 4. The cavity 18 formed in the encapsulation 36 further comprises a sliding means 32 comprising a set of metal slots 32 on either side into which the light strip 28 is slid into. The slots 32 support the circuit board 26 aligning it and holding it firmly in place at the bottom of the cavity 18. The unobstructed area above the circuit board 26 facilitate heat management. The centerlines 39 of the LED 22 and the injection edge of glass form a 90-degree angle. The LED 22 is mounted on the circuit board 26 and centered with and surrounded by a plastic light guide 24. The walls of the light guide 24 are coated with a reflective coating other than at the aperture 38 where the light exists the guide 24 and is injected into the edge of inner glass layer 202.

Figure 5:
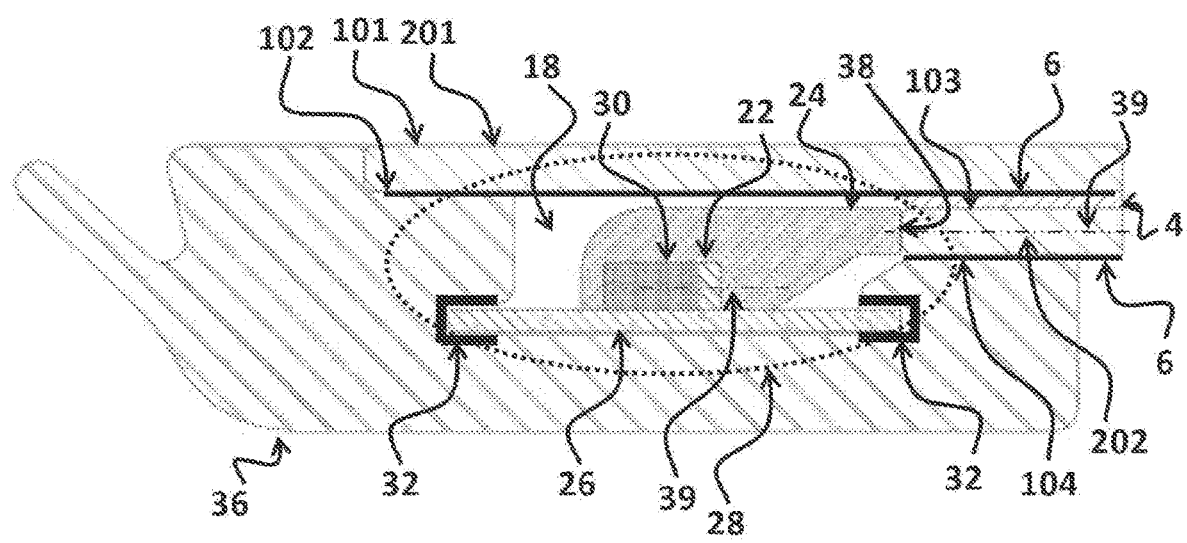
FIG. 5 Cross section showing "U" profile encapsulation with bottom mount light strip and 90-degree angle between edge of glass and LED centerlines and a heat dissipating material bonded to the LED.

2) Embodiment 2 is shown in FIG. 5. The cavity 18 formed in the encapsulation 36 further comprises a sliding means 32 comprising a set of metal slots 32 on either side into which the light strip 28 is slid into. The slots 32 support the circuit board 26 aligning it and holding it firmly in place at the bottom of the cavity 18. The unobstructed areas above the circuit board 26 facilitate heat management. The centerline 39 of the LED 22 and the injection edge of glass are parallel but offset and not in a direct line. The LED 22 is mounted on the circuit board 26 and centered with and surrounded by a plastic light guide 24. The walls of the light guide 24 are coated with a reflective coating other than at the aperture 38 where the light exist the light guide 24 and is injected into the edge of inner glass layer 202.

Figure 6:
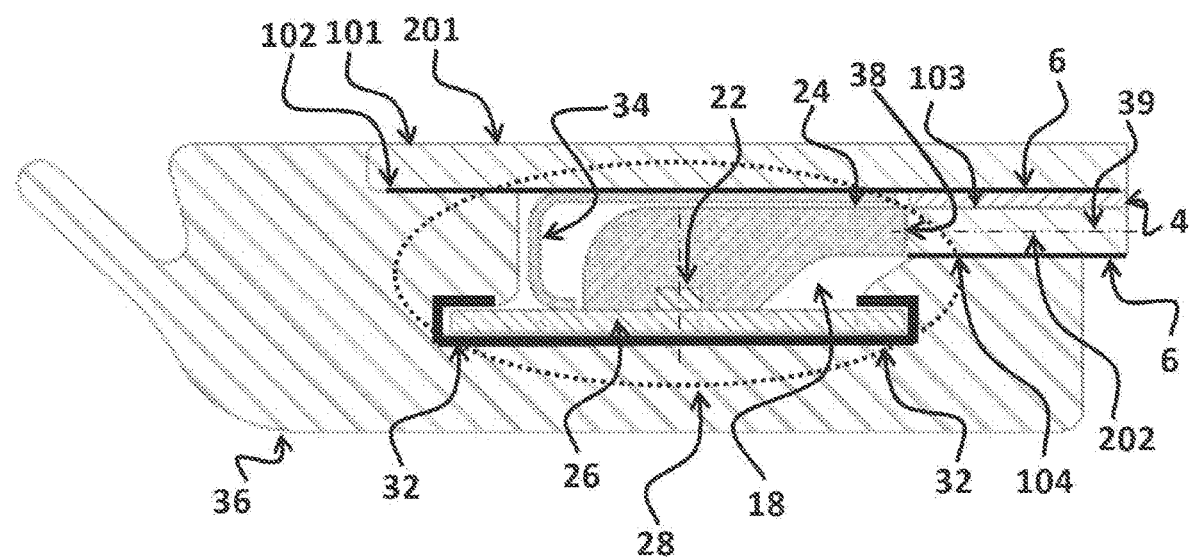
FIG. 6 Cross section showing "U" profile encapsulation with bottom mount light strip and 90-degree angle between edge of glass and LED centerlines and a spring holding the light strip in place.

3) Embodiment 3 is show in FIG. 6. Embodiment three is the same as embodiment 1 further comprising the addition of a spring 34 attached to the circuit board 26 of the light strip 28. The spring 34 applies pressure to the light strip 28 to further secure it in place.

Figure 7:
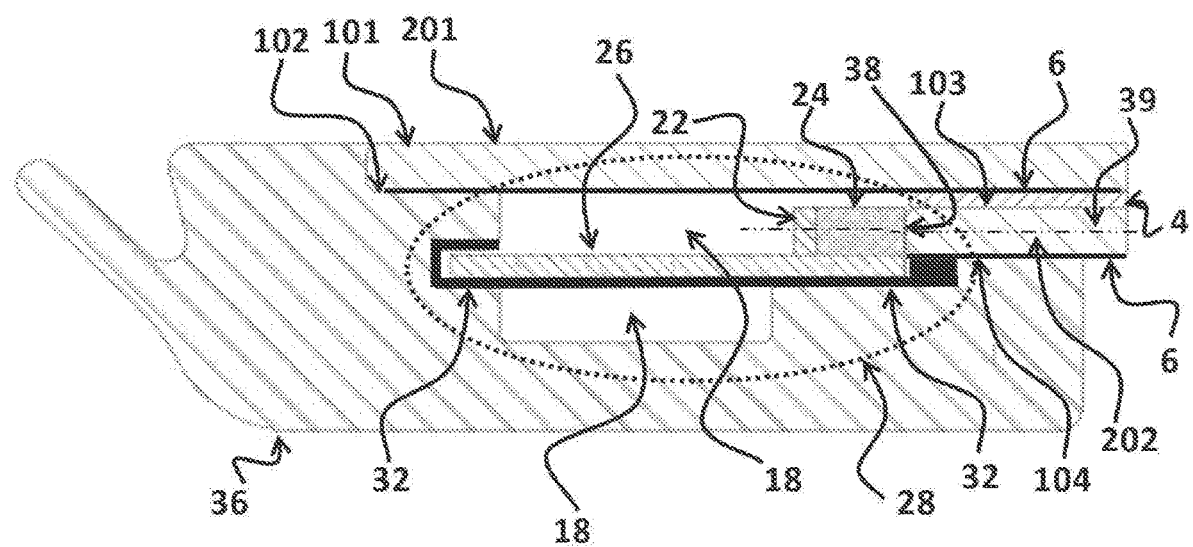
FIG. 7 Cross section showing "U" profile encapsulation with light strip centered within cavity and edge of glass and LED centerlines aligned.

4) Embodiment 4 is shown in FIG. 7. The cavity 18 formed in the encapsulation 36 comprises a sliding means 32 comprising a metal slot 32 into which the light strip 28 is slid into. The slot 32 support the circuit board 26 aligning it and holding it firmly in place and centered vertically in the cavity 18. The unobstructed area above and below the circuit board 26 facilitate heat management. The centerlines 39 of the LED 22 and the injection edge of glass are aligned. The LED 22 is mounted on the circuit board 26 and bonded to a plastic light guide 24. The walls of the light guide 24 are coated with a reflective coating other than at the aperture 38 where the light exist the light guide 24 and is injected into the edge of inner glass layer 202.

5) Embodiment 5 is shown in FIG. 8. Embodiment 5 is the same as embodiment 4 except for the cavity. The cavity is a "C" profile rather than the "U" profile of the previous embodiments.

6) Embodiment 6 is shown in FIG. 11. The inserts 32 embedded in the cavity 18 formed in the cavity create a sliding mean to mount the light strip 28. The sliding means 32 supports and aligns the circuit board 26 holding it firmly in place at the center of the cavity 18. The unobstructed area above and below the circuit board 26 facilitate heat management. The centerlines 39 of the LED 22 and the injection edge of glass are aligned. The LED 22 is mounted on the circuit board 26 and positioned within 1 mm of the edge of glass where the light is injected into the edge of inner glass layer 202.

Figure 12:
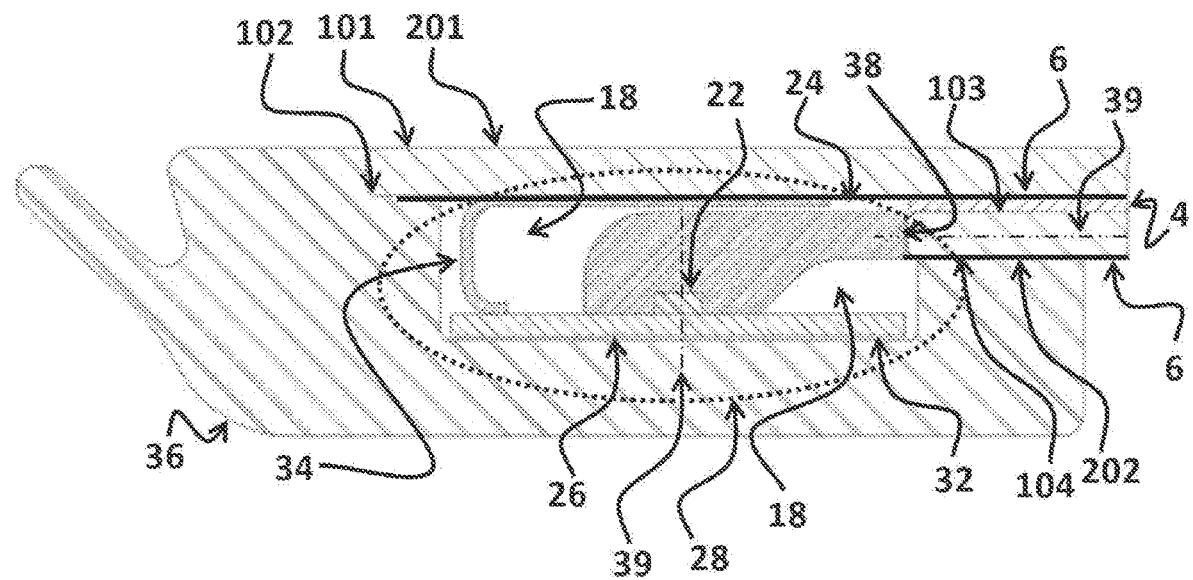
FIG. 12 Cross section of encapsulation with spring sliding means and no sliding means cavity insert.

7) Embodiment 7 is shown in FIG. 12. Embodiment 7 is similar to FIG. 6. A spring 34 is attached to the light strip 28 as in embodiment 7 but the sliding means insert is not used. Instead, the bottom and sides of the light strip 28 has a durable low coefficient of friction layer bonded to it. The strip is slide into place and held by the tension from the spring 34. The tight tolerances of the cavity and the light strip 28 guarantee correct alignment.

Figure 13A:
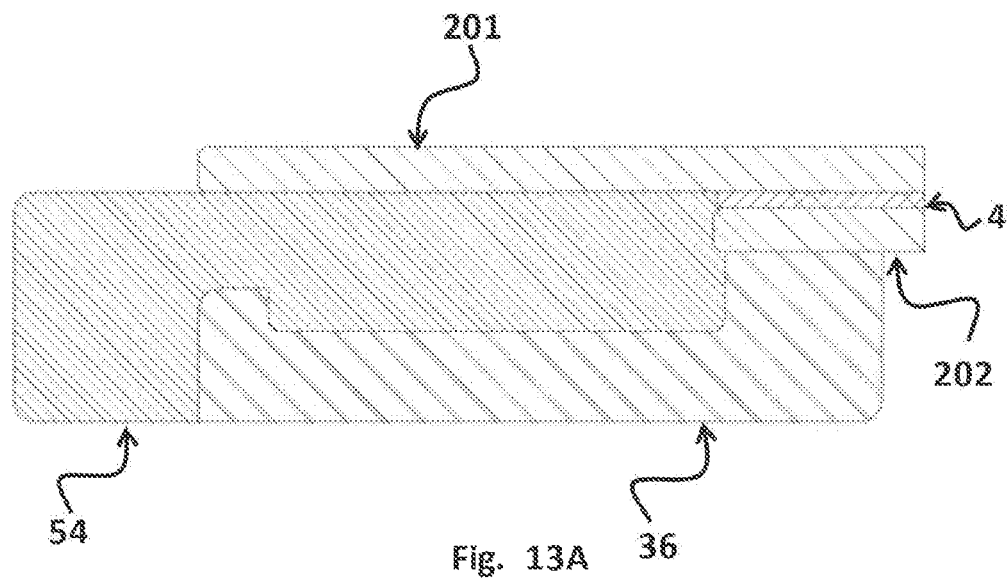
FIG. 13A Cross section of open edge encapsulation with core.
Figure 13B:
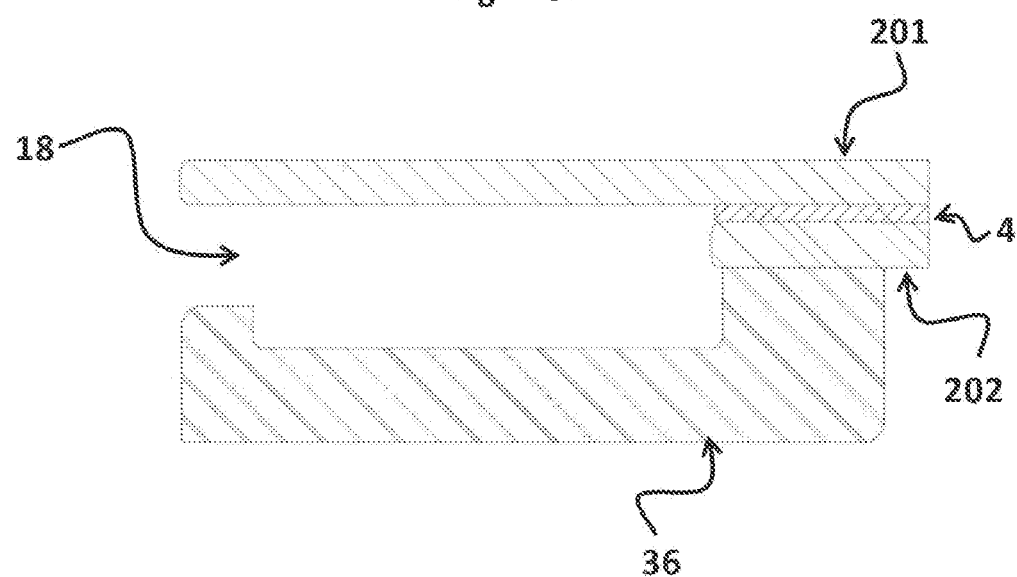
FIG. 13B Cross section of open edge encapsulation with core removed showing cavity.
Figure 14A:
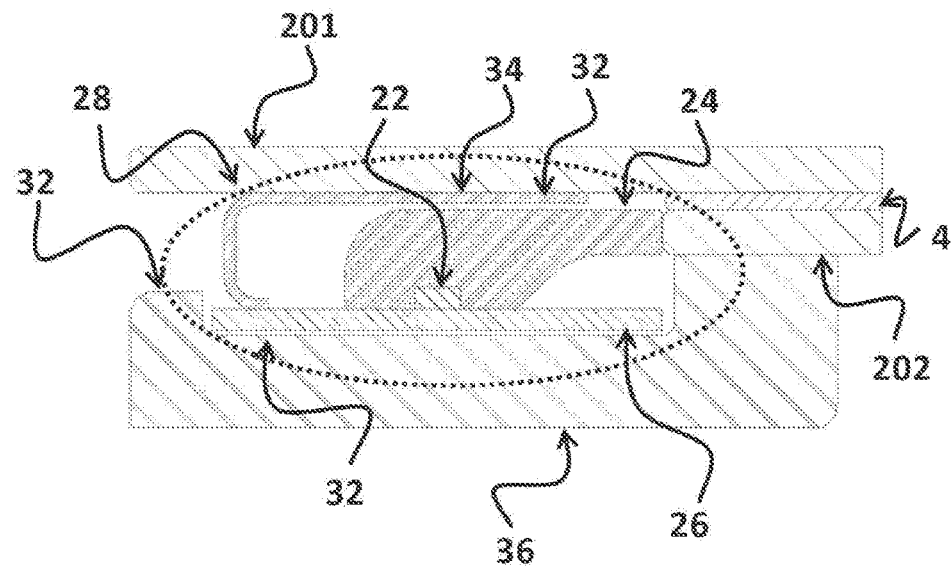
FIG. 14A Cross section of open edge encapsulated glass with light strip inserted.
Figure 14B:
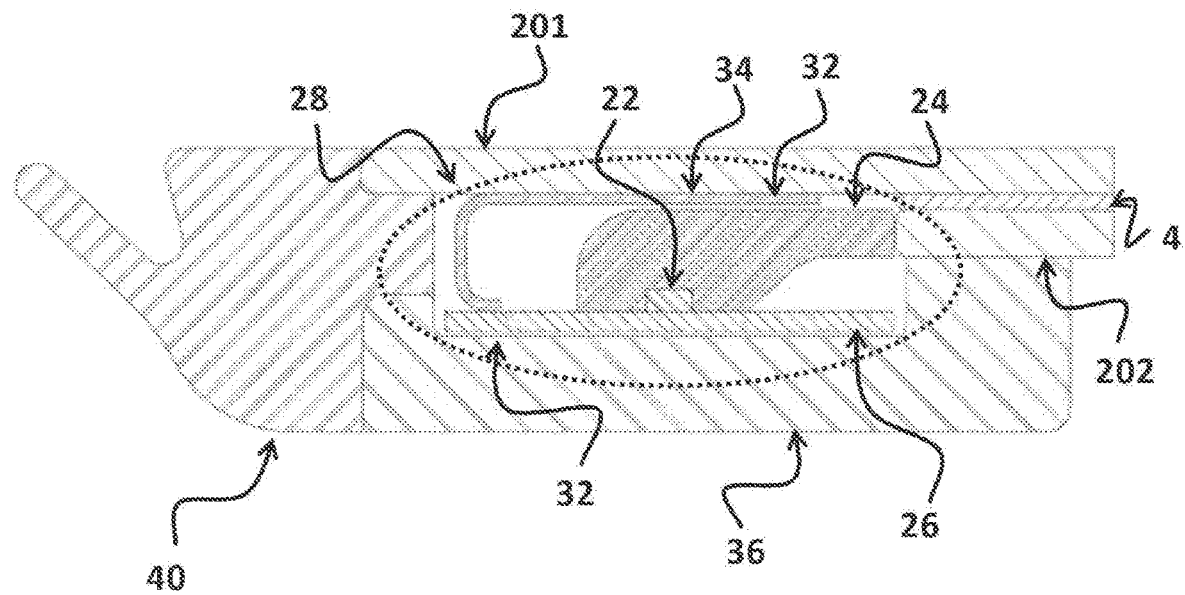
FIG. 14B Cross section of open edge encapsulated glass with light strip inserted and plug bonded to edge sealing cavity.

8) Embodiment 8 is shown in FIGS. 13A, 13B, 14A, 14B. In this embodiment, the cavity 18 formed by the initial encapsulation 36 is open along its length rather than just at the opposite ends. This may be desirable if the light strip 28 does not run the entire length or along a substantial portion of the length of the glazing. The cavity 18 cross section has a C profile and is open along the outboard edge. The encapsulation 36 with the core 54 in place is shown in FIG. 13A. FIG. 13B shows the encapsulation 36 with the core 53 removed. The width of the opening is sufficient to slide and insert the light strip 28 after encapsulation. As the plastic is flexible the width of the opening need not be as wide at the light strip 28. The sliding means 32 allow for insertion of the light strip 28 through the gap along the length of the cavity 18 or from either end if an opening is provided. After insertion of the light strip 28 a mating molding is bonded to the encapsulation which serves as the plug 40.

Figure 15:
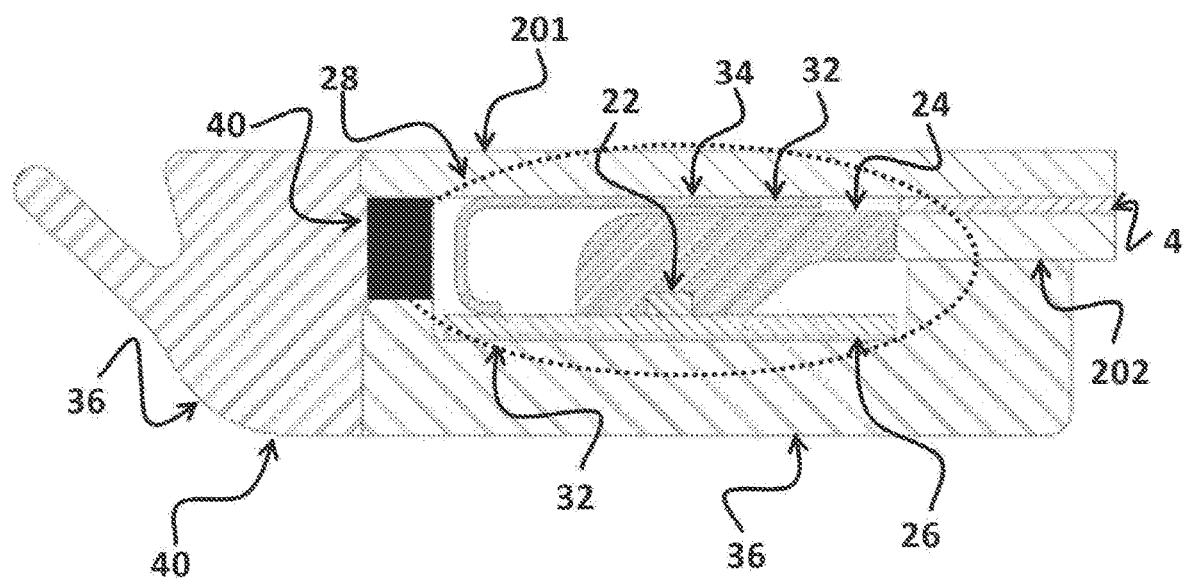
FIG. 15 Cross section of open edge encapsulated glass with light strip inserted and plug sealing cavity and a second encapsulation.

9) Embodiment 9 is similar to embodiment 8 other than in the composition of the plug. Two plugs are used. A first plug is used to fill the gap in the C shaped encapsulation. Rather than bonding a molding, the glazing with the first encapsulation and plug installed sealing the cavity, is again placed in a mold where a second encapsulation is performed. A cross section of embodiment 9 is shown in FIG. 15.

Figure 16A:
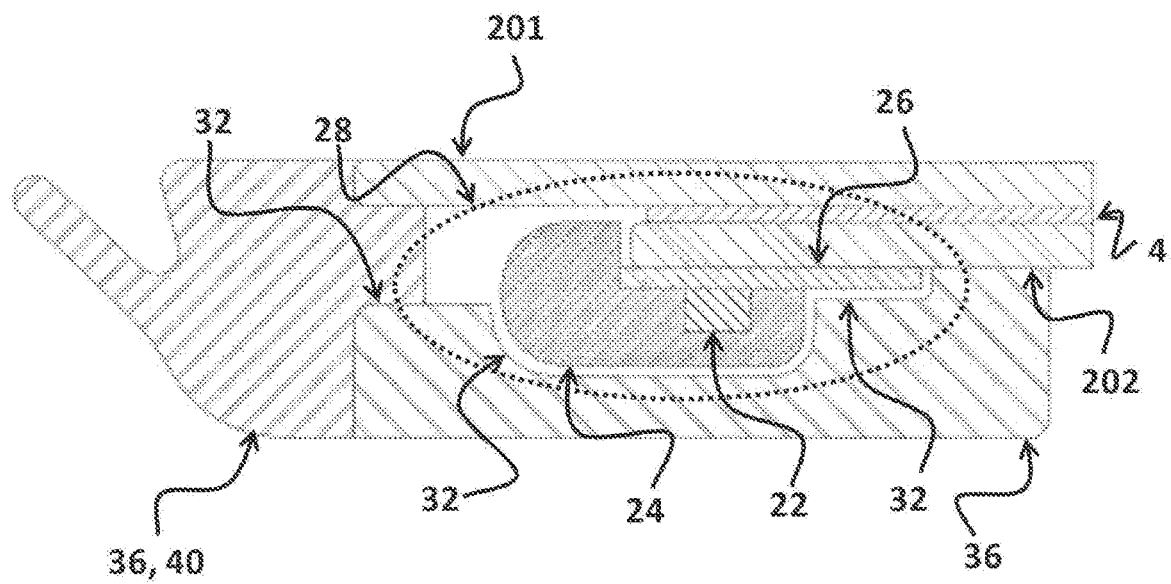
FIG. 16A Cross section of open edge encapsulation with light strip inserted and light strip positioned to inner glass layer and plug bonded to edge of glass.

10) Embodiment 10 is similar to Embodiment 8 and is illustrated in FIG. 16A. In this embodiment, the light strip 28 nests to surface four 104 of the inner glass layer 202. The light is guided by the light guide 24 with the axis of the injection surface and the light emitting surfaces forming a 135-degree angle. This allows for a narrower glass offset between the two glass layers. The cavity is sealed by a plug bonded to the encapsulation and the glass.

Figure 16B:
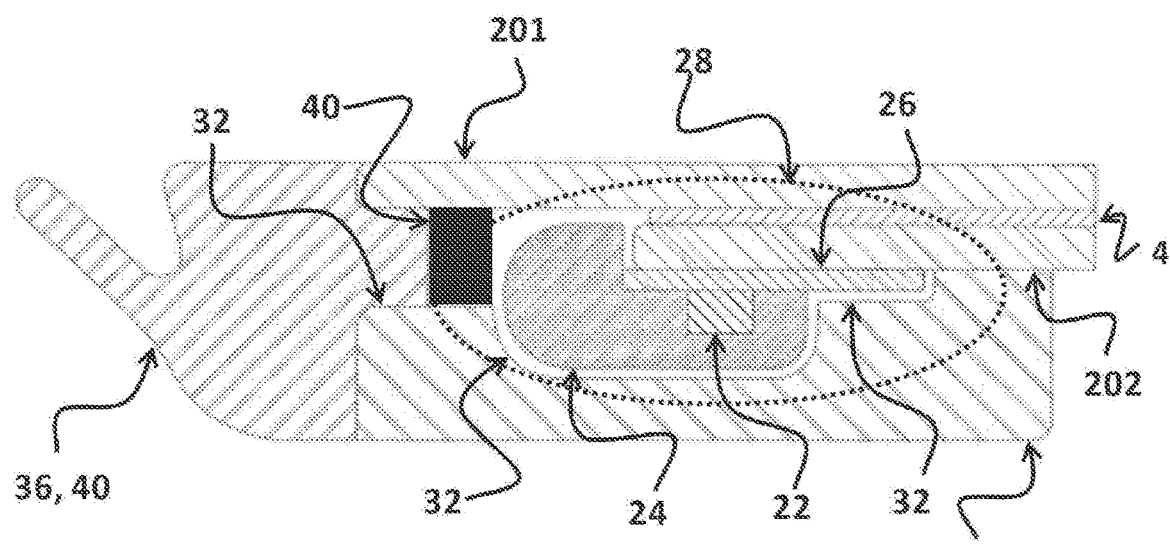
FIG. 16B Cross section of open edge encapsulation with light strip inserted and light strip positioned to inner glass layer and plug sealing cavity and a second encapsulation.

11) Embodiment 11 is similar to Embodiment 9 and is illustrated in FIG. 16B. In this embodiment, the light strip 28 nests to surface four 104 of the inner glass layer 202. The light is guided by the light guide 24 with the axis of the injection surface and the light emitting surfaces forming a 135-degree angle. This allows for a narrower glass offset between the two glass layers. The cavity is sealed by a plug bonded to the encapsulation and the glass. The glazing with the first encapsulation and plug installed sealing the cavity, is again placed in a mold where a second encapsulation is performed. A cross section of embodiment 9 is shown in FIG. 16B.

12) Embodiment 12 is similar to embodiment 1 with the expectation of the encapsulation. The light strip 28 is bonded to surface two 102 of the outer glass layer 201. A bead of adhesive is applied to the far side of the cavity along the edge where the light strip 28 will nest after insertion. The light strip 28 is inserted along the side opening of the cavity. An extruded molding is then bonded to the encapsulation plugging the opening.

13) Embodiment 13 is similar to embodiment 12. However, rather than closing the side opening by means of an extruded molding, a second encapsulation is applied to plug the opening.

14) Embodiment 14 is similar to embodiments 11 and 12. Rather than bonding the light strip 28 to the cavity, the light strip 28 is held in place by a set of female inserts, places every 200 mm along the length of the cavity and a set of mating plastic s along the light strip 28. The inserts are attached to and held in place by the core that produces the side opening cavity. After the core is removed, the inserts remain. The thin wall and soft plastic allow the lower lip of the encapsulation among the opening to be spread sufficient to allow for the light strip 28 to be slid into position and locked in place. Likewise, the inserts are made of a hard elastomer. Installation of the light strip 28 inserted into the sliding means 32 is shown in the isometric view of FIG. 19.

15) Embodiment 15, shown in FIG. 22, comprises a sliding means 32 bracket that is bonded to surface two 102 of the outer glass layer 201 and surface four 104 of the inner glass layer 202. The bracket completely surrounds the cavity that the light bar is inserted into and as such does not require a core to be used in the encapsulation mold.

The invention claimed is:

1. An encapsulated illuminated automotive glazing, comprising:
   at least two glass layers, an outer glass layer and an inner glass layer;
   a plastic interlayer serving to permanently bond the outer and the inner glass layers each other;
   a light strip having a circuit board and at least one light source;
   an encapsulation covering at least a portion of the glazing periphery and forming a cavity therein, the encapsulation being provided with at least one opening enabling access to said cavity; and
   a sliding means which provides for ease of installation, alignment and securing of the light strip into said cavity;
   at least one plug fitted in a corresponding opening.

2. The encapsulated illuminated automotive glazing of claim 1, further comprising at least one light guide which gathers light emitted by said at least one light source and injects said light into a light injection area of the glazing.

3. The encapsulated illuminated automotive glazing of claim 1, wherein the sliding means is implemented in whole or in part as a feature of the light strip.

4. The encapsulated illuminated automotive glazing of claim 1, wherein the sliding means comprises at least one functional feature formed within the encapsulation.

5. The encapsulated illuminated automotive glazing of claim 1, wherein the sliding means comprises at least one insert embedded within or fix to the encapsulation.

6. The encapsulated illuminated automotive glazing of claim 1, wherein the sliding means comprises mechanical features fixed to at least one of the glass layers.

7. The encapsulated illuminated automotive glazing of claim 1, wherein the light strip comprises a mating feature allowing the light strip to be slid into the cavity.

8. The encapsulated illuminated automotive glazing of claim 3, wherein the light strip is equipped with a spring to maintain tension against the cavity walls.

9. The encapsulated illuminated automotive glazing of claim 3, wherein the functional mechanical feature of the sliding means operates in conjunction with other sliding means functional features formed within the encapsulation.

10. The encapsulated illuminated automotive glazing of claim 1, wherein the at least one opening is substantially the length of the light strip.

11. The encapsulated illuminated automotive glazing of claim 1, wherein the at least one opening is provided along the length of the encapsulation.

12. The encapsulated illuminated automotive glazing of claim 11, wherein the at least one plug is secured to both the encapsulation and one of the glass layers.

13. The encapsulated illuminated automotive glazing of claim 11, wherein the at least one plug is implemented as a mating mold secured to both the encapsulation and one of the glass layers.

14. The encapsulated illuminated automotive glazing of claim 11, further comprising a second encapsulation.

15. The encapsulated illuminated automotive glazing of claim 1, wherein the at least one opening is provided on at least one end of the encapsulation.

16. The encapsulated illuminated automotive glazing of claim 15, further comprising a second encapsulation.

17. The encapsulated illuminated automotive glazing of claim 1, wherein said at least one light source is an LED.

18. The encapsulated illuminated automotive glazing of claim 17, wherein the LED emits light that is not in the visible range of light.

19. The encapsulated illuminated automotive glazing of claim 1, further comprising a heat dissipating material applied to the light strip.

20. The encapsulated illuminated automotive glazing of claim 1, wherein the light strip has an average cross section no greater than 80% of that of the cavity, preferably no greater than 60%, more preferably no greater than 40%.

21. The encapsulated illuminated automotive glazing of claim 1, wherein the inner glass layer is a light conducting layer.

22. The encapsulated illuminated automotive laminate of claim 17, wherein the center line of the light emitting surface of the LED and the surface normal of glass at the injection area of the surface are either aligned or offset.

23. The encapsulated illuminated automotive laminate of claim 17, wherein the center line of the light emitting surface of the LED and the surface normal of glass at the injection area of the surface are not aligned by at least 30 degrees, or at least 60 degrees, or at least 90 degrees.

24. Method to manufacture encapsulated illuminated automotive glazing, comprising the following steps:
   providing an injection molding machine, a mold, a glazing, at least one light strip, at least one core;
   attaching said core to said glazing;
   placing the glazing with core into said mold;
   using said injection molding machine to inject plastic into and filling said mold;
   allowing plastic to cool;
   removing the glazing from said mold;
   removing said core from encapsulation;
   providing sliding means;
   sliding light strip into sliding means; and
   inserting plug in each cavity opening.

25. The method of claim 24, further comprising the steps of:
   providing an injection molding machine, a mold, a glazing, at least one light strip, at least one core;
   attaching said sliding means insert to said core;
   attaching said core to said glazing;
   placing glazing with core and sliding means insert into said mold;
   using said injection molding machine to inject plastic into and filling said mold;
   allowing plastic to cool;
   removing glazing from said mold;
   removing said core from encapsulation;
   providing sliding means;
   sliding light strip into the sliding means; and
   inserting plug in each cavity opening.

26. Method to manufacture encapsulated illuminated automotive glazing of claim 24, comprising the following steps:
   providing an injection molding machine, a mold, a glazing, at least one light strip, the mold being designed to generate a cavity in the encapsulation;
   placing glazing into said mold;
   using said injection molding machine to inject plastic into and filling said mold;
   allowing plastic to cool;
   removing glazing from said mold;
   sealing the cavity generated by the first encapsulation;
   providing a second injection molding machine and a second mold;
   placing the glazing with the first encapsulation into the second mold;
   removing glazing from said mold;
   providing sliding means;
   sliding light strip into sliding means; and
   inserting plug in each cavity opening.

27. The method of claim 26, further comprising the steps of:
   providing an injection molding machine, a mold, a glazing, at least one light strip, the mold designed to generate a cavity in the encapsulation, at least one sliding means insert;
   placing glazing and sliding means insert in said mold into said mold;
   using said injection molding machine to inject plastic into and filling said mold;
   allowing plastic to cool;
   removing glazing from said mold;
   sealing the cavity generated by the encapsulation;
   providing a second injection molding machine and a second mold;
   placing the glazing with the first encapsulation into the second mold;
   removing glazing from said mold;
   providing sliding means;
   sliding light strip into sliding means; and
   inserting plug in each cavity opening.

* * * * *